United States Patent
Di Domenico et al.

(10) Patent No.: US 10,750,346 B1
(45) Date of Patent: Aug. 18, 2020

(54) EMERGENCY INCIDENT DETECTION PLATFORM

(71) Applicant: Unisys Corporation, Blue Bell, PA (US)

(72) Inventors: Michael J. Di Domenico, Malvern, PA (US); Edward T. Cavanagh, Norristown, PA (US); Dmitriy Yarmaliuk, Malvern, PA (US); Brittney Burchett, Lansdale, PA (US); Michael C. Leap, Collegeville, PA (US); Cody Finn, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 16/536,094

(22) Filed: Aug. 8, 2019

(51) Int. Cl.
| | |
|---|---|
| *H04M 11/04* | (2006.01) |
| *H04W 4/90* | (2018.01) |
| *H04W 4/029* | (2018.01) |
| *G06F 3/0481* | (2013.01) |
| *H04W 4/12* | (2009.01) |
| *H04W 4/08* | (2009.01) |

(52) U.S. Cl.
CPC ............ *H04W 4/90* (2018.02); *G06F 3/0481* (2013.01); *H04W 4/029* (2018.02); *H04W 4/08* (2013.01); *H04W 4/12* (2013.01)

(58) Field of Classification Search
CPC .... H04M 11/04; H04M 2242/04; H04W 4/90; H04W 76/50
See application file for complete search history.

(56) References Cited

U.S. PATENT DOCUMENTS

| | | | |
|---|---|---|---|
| 2007/0167147 A1* | 7/2007 | Krasner | G08B 25/009 455/404.2 |
| 2012/0154157 A1* | 6/2012 | George | G08B 21/02 340/584 |
| 2016/0323233 A1* | 11/2016 | Song | G06Q 50/30 |
| 2017/0113664 A1* | 4/2017 | Nix | G06F 11/3072 |
| 2017/0318444 A1* | 11/2017 | Estes | H04W 4/021 |
| 2018/0288224 A1* | 10/2018 | Dizengof | H04M 3/5116 |
| 2018/0365785 A1* | 12/2018 | Boss | G06Q 50/265 |
| 2019/0182651 A1* | 6/2019 | South | H04W 4/90 |
| 2019/0277986 A1* | 9/2019 | Myers | G10K 11/26 |
| 2019/0286793 A1* | 9/2019 | Patton | H04W 4/021 |

\* cited by examiner

*Primary Examiner* — Shantell L Heiber
(74) *Attorney, Agent, or Firm* — Merchant & Gould P.C.

(57) ABSTRACT

Methods and systems for providing an emergency incident response are described. Data is received from a plurality of heterogeneous data feeds each having a native format and including one or more publically-available data feeds. Event data is extracted from the received data, the event data representing one or more events from one or more of the plurality of heterogeneous data feeds, and the event data is translated from the native format into a standardized analysis format. Further, an existence and a priority level of at least one emergency incident contemporaneous with the event data and based at least in part on the event data is determined, the priority level being selected from among a plurality of predefined priority levels, and a graphical user interface including a message describing the at least one determined emergency incident is displayed.

18 Claims, 17 Drawing Sheets

| # | Keywords | Address | Date |
|---|---|---|---|
| 1 | robbery,stole | 429 PA-401, Malvern, PA 19355, USA | 8/7/2018, 9:18:44 AM |
| 2 | robber,stole,robbery | 429 Conestoga Rd, Malvern, PA 19355, USA | 8/7/2018, 9:19:34 AM |
| 3 | car,stole,broke,robber,robbery | 423 PA-401, Malvern, PA 19355, USA | 8/7/2018, 9:20:50 AM |

EMERGENCY INCIDENT DETECTION PLATFORM

BACKGROUND

Emergency services personnel and average citizens have access to a wide breadth of information relating to possible dangerous situations in their vicinity. However, the dissemination of this information is often a slow, manual, and unreliable process which puts lives at risk. In the event of an incident, emergency services personal must analyze each individual report which makes it difficult to execute time critical actions. Likewise, individuals often find it problematic to relay and receive information related to a given incident due to the highly fragmented means of communication at their disposal.

Effective communication is the single most important factor when dealing with an emergency event, and in particular, a mass casualty event. The key to effective communication in such a situation is to obtain up to date and accurate information and thereby obtain situational awareness. The sheer volume of information coming in from a myriad of sources can be overwhelming to even the best-trained personnel from the law enforcement community.

In addition, effective communication is important when dealing with other types of non-emergency public incidents as well, such as events held in public areas like concerts, traffic congestion, protests, or flash mobs.

Accordingly, improvements in communication and dissemination of information relating to public incidents in general, and emergency incidents in particular, are desirable.

SUMMARY

In summary, the present disclosure relates to methods and systems for gathering and identifying data relating to emergency incidents or public incidents, verifying the existence of emergency or public incidents, and disseminating appropriate information to the public and to emergency services personnel.

In a first aspect, an emergency incident response system is disclosed. The emergency incident response system includes a programmable circuit and a memory storing computer-executable instructions. When executed by the programmable circuit, the computer-executable instructions cause the enterprise security management configuration server to receive data from a plurality of heterogeneous data feeds each having a native format, the plurality of heterogeneous data feeds including one or more publically-available data feeds. Further, the computer-executable instructions cause the enterprise security management configuration server to extract event data from the received data, the event data representing one or more events from one or more of the plurality of heterogeneous data feeds, and translate the event data from the native format of the one or more heterogeneous data feeds into a standardized analysis format. Further still, the computer-executable instructions cause the enterprise security management configuration server to determine an existence and a priority level of at least one emergency incident contemporaneous with the event data and based at least in part on the event data, the priority level being selected from among a plurality of predefined priority levels, and display a graphical user interface including a message describing the at least one determined emergency incident.

In a second aspect, a method of providing an emergency incident response is disclosed. The method includes receiving data from a plurality of heterogeneous data feeds each having a native format, the plurality of heterogeneous data feeds including one or more publically-available data feeds. The method further includes extracting event data from the received data, the event data representing one or more events from one or more of the plurality of heterogeneous data feeds. The method further includes translating the event data from the native format of the one or more heterogeneous data feeds into a standardized analysis format, and determining an existence and a priority level of at least one emergency incident contemporaneous with the event data and based at least in part on the event data, the priority level being selected from among a plurality of predefined priority levels. The method further includes displaying a graphical user interface including a message describing the at least one determined emergency incident.

In a third aspect, an emergency incident response system is disclosed. The emergency incident response system includes a computing system communicatively connected to a plurality of client devices. The computing system is configured to receive data from a plurality of heterogeneous data feeds each having a native format, the plurality of heterogeneous data feeds including one or more publically-available data feeds. The computing system is further configured to extract event data from the received data, the event data representing one or more events from one or more of the plurality of heterogeneous data feeds. The computing system is further configured to translate the event data from the native format of the one or more heterogeneous data feeds into a standardized analysis format. The computing system is further configured to determine an existence and a priority level of at least one emergency incident contemporaneous with the event data and based at least in part on the event data, the priority level being selected from among a plurality of predefined priority levels. The computing system is further configured to display a graphical user interface including a message describing the at least one determined emergency incident and send at least one emergency incident notification alert to the plurality of client devices. The plurality of client devices are configured to, based on proximity to the location of the at least one determined emergency incident, receive the at least one emergency incident notification alert and send data associated with the one or more events to the computing system. The plurality of client devices are further configured to display a graphical user interface including a message describing the at least one determined emergency incident.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 15 is an image of an example archive dialog box for retrieving archived incidents, according to an example embodiment of the present disclosure.

DETAILED DESCRIPTION

Figure 1:
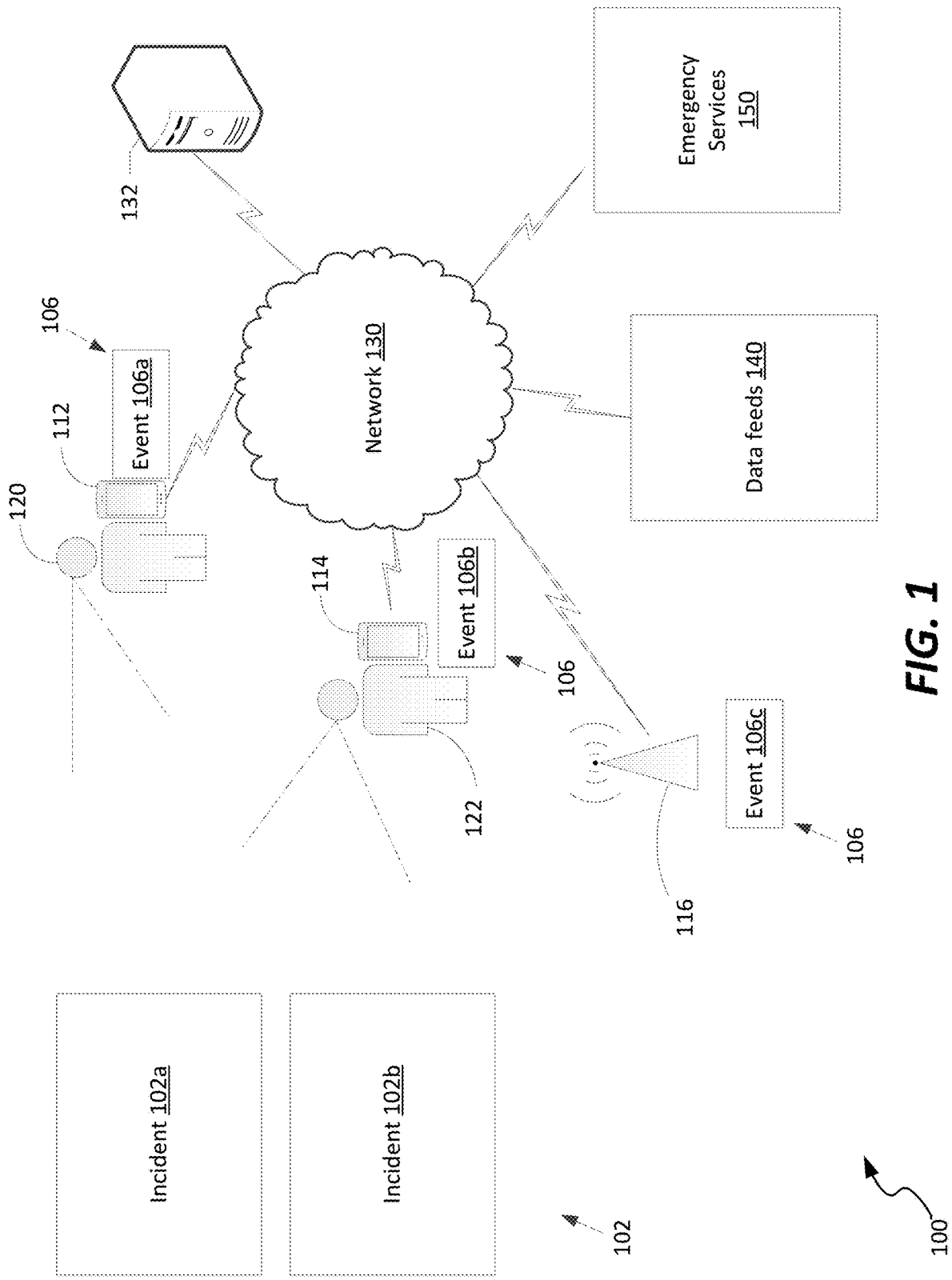
FIG. 1 illustrates a schematic view of an example emergency incident response environment in which aspects of the present disclosure can be implemented.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to a system useable to identify public or emergency incidents and provide notifications of public or emergency incidents. The methods and systems described herein allow for the determination of public or emergency incidents based on data received from a variety of heterogeneous data feeds, including client devices running a public or emergency incident response system application, emergency phone calls from the public, reports from emergency services personnel, social media feeds, public or private cameras or video cameras, public or private beacons, e.g. fixed location sensors such as Shotspotter® audio sensors, and Internet of Things (IoT) enabled devices. Such a system may receive data from a plurality of heterogeneous data feeds, extract relevant data relating to events that may be related to an emergency or public incident, and determine the existence of an emergency or public incident. The method and systems disclosed allow for displaying a graphical user interface including details of events and incidents and for receiving user input, such as event reporting and verification and incident verification, as well as generating and sending alerts to the public and emergency services personnel tailored to include information based on recipient role.

Referring now to FIG. 1, a schematic view of an example emergency incident response environment 100 in which aspects of the present disclosure can be implemented is illustrated. In the illustrated example, the environment includes incidents 102a and 102b (collectively, incidents 102), events 106a, 106b, and 106c (collectively, events 106), mobile devices 112 and 114, a beacon 116, users 120 and 122, a network 130, a server 132, a data feed 140, and emergency services personnel 150.

In the example shown, the incidents 102 are occurrences that take place in the physical world at a particular time and location, or over a particular period of time and within a particular area. The example shows two incidents, the incident 102a and the incident 102b, however in some embodiments there may be more or fewer incidents, each of which may occur at different times and locations, or over different periods of time and within different areas. The incidents 102 can include public incidents such as concerts, traffic congestion, protests, flashmobs, press conferences, conventions, charity events, fundraising events, sporting events, or any other type of public incident. The incidents 102 can also include emergency incidents such as crimes in progress, shootings, hostage situations, kidnappings, assaults, robberies, accidents, or any other emergency incident.

The example shown in FIG. 1 also includes the mobile devices 112 and 114 which can be used by the users 120 and 122. In some embodiments, the mobile devices 112 and 114 can be mobile computing devices such as the computing device 300 described in further detail with respect to FIG. 3 below. The mobile devices 112 and 114 can include user input mechanisms, such as graphical user interfaces implement by applications or other software, and communication mechanisms to connect to other devices through the network 130, such as wireless communication via Wi-Fi, cellular, or other radio signals, as well as wired communication means. In the example shown, the users 120 and 122 observe the incidents 102, and can communicate information about the incidents 102 via the mobile devices 112 and 114.

The example shown in FIG. 1 also includes a beacon 116. The beacon 116 can include a sensor for detecting the incidents 102. For example, in some embodiments the beacon 116 can be a ShotSpotter® gunshot audio signal sensor. In some embodiments, the beacon 116 can be a visible or thermal imaging camera, an emergency call box at a defined location, a fire alarm at a defined location, or any other type of sensor. In the example shown, the beacon 116 is able to securely communicate with the network 130, for example, by using technologies such as the Stealth enterprise security solution from Unisys Corporation of Blue Bell, Pa. In other embodiments, the beacon 116 can communicate by any other means, such as over phone lines.

In the embodiment shown, the communication by an entity observing an incident is an event, and the event contains information pertaining to the incident. For example, as shown in FIG. 1, the user 120 observes one or both of the incidents 102 and generates the event 106a regarding one or both of the incidents 102 using the mobile device 112, e.g. the event 106a can be the action of a phone call to emergency services personnel. Similarly, user 122 observes one or both of the incidents 102 and generates the event 106b regarding one or both of the incidents 102 using the mobile device 114, e.g. the event 106b can be the action of a social media post. The beacon 116 can also observe one or both of the incidents 102 and generates the event 106c regarding one or both of the incidents 102, for example a signal generated by a sensor included in the beacon 116. In some embodiments, the users 120 and 122 can generate the events 106a-b by executing an application on the mobile devices 112 and 114 and inputting a message regarding one or both of the incidents 102. For example, the users 120 and 122 can run the SmartApp 248, described in further detail with respect to FIG. 8 below, on the mobile devices 112 and 114 to send a message to a public or emergency incident response system 200, such as described in further detail below with respect to FIG. 2 below, via a connection to the network 130. In some embodiments, all of the events 106 generated by observers or beacons can be regarding a single incident, for example the incident 102a, or can each be regarding different incidents, for example the incidents 102a and 102b, or can each be regarding multiple incidents 102, or any combination thereof.

In some embodiments, the location and time at which an event 106 is generated, along with the event message, is included in the event 106. For example, the locations of the mobile devices 112 and 114 generating the events 106a-b, the time the events 106a-b are generated, and a message regarding one or more incidents 102 are included in the events 106a-b. In some embodiments, the GPS coordinates of the mobile device 114 at the time of the creation of the social media post by the user 122 regarding one or both of the incidents 102, as well as the text of the social media post, can be included in the event 106b. Other methods of determining the location of a mobile device can be used as well, for example, mobile device tracking using radio signals between cellular towers, e.g. multilateration or triangulation. In some embodiments, the location from which an event 106 is generated is known, for example the event 106c generated by the beacon 116 which is at a fixed, known location. Also, in some embodiments the message included in an event 106 is a signal, such as a signal from a sensor included with the beacon 116, the signal being included in the event 106c in the example shown, along with the time of the generation of the event 106c and the location of the creation of the event 106c, e.g. the location of the beacon 116.

The data feed 140 illustrated in FIG. 1 can include social media feeds, website postings, internet data feeds, broadcast radio signals including radio and television signals, cable signals, or any other type of data feed or signal. The emergency services 150 can include any type of emergency services, governmental or private, for example a 911 call center or a private security services call center. In some embodiments, the data feed 140 can include the mobile devices 112 and 114 and the beacon 116.

In the example shown, the mobile devices 112 and 114, the beacon 116, the data feeds 140, and the emergency service personnel 150 are separated from the server 132 by a network 130. The network 130 can, in some cases, represent an at least partially public network such as the Internet. In some embodiments, the mobile devices 112 and 114, the beacon 116, the data feeds 140, and the emergency services 150 include computing devices which are configured to access the server 132.

In the example shown, the server 132 can represent a public or emergency incident response server, as well as one or more additional servers. For example, the server 132 can also represent a public or emergency response server that receives events via the network 130, processes the received events to validate and determine details regarding one or more public or emergency incidents, and sends notifications or alerts regarding the public or emergency incidents. Further details regarding the server 132 are described with respect to FIG. 4 below.

Figure 2:
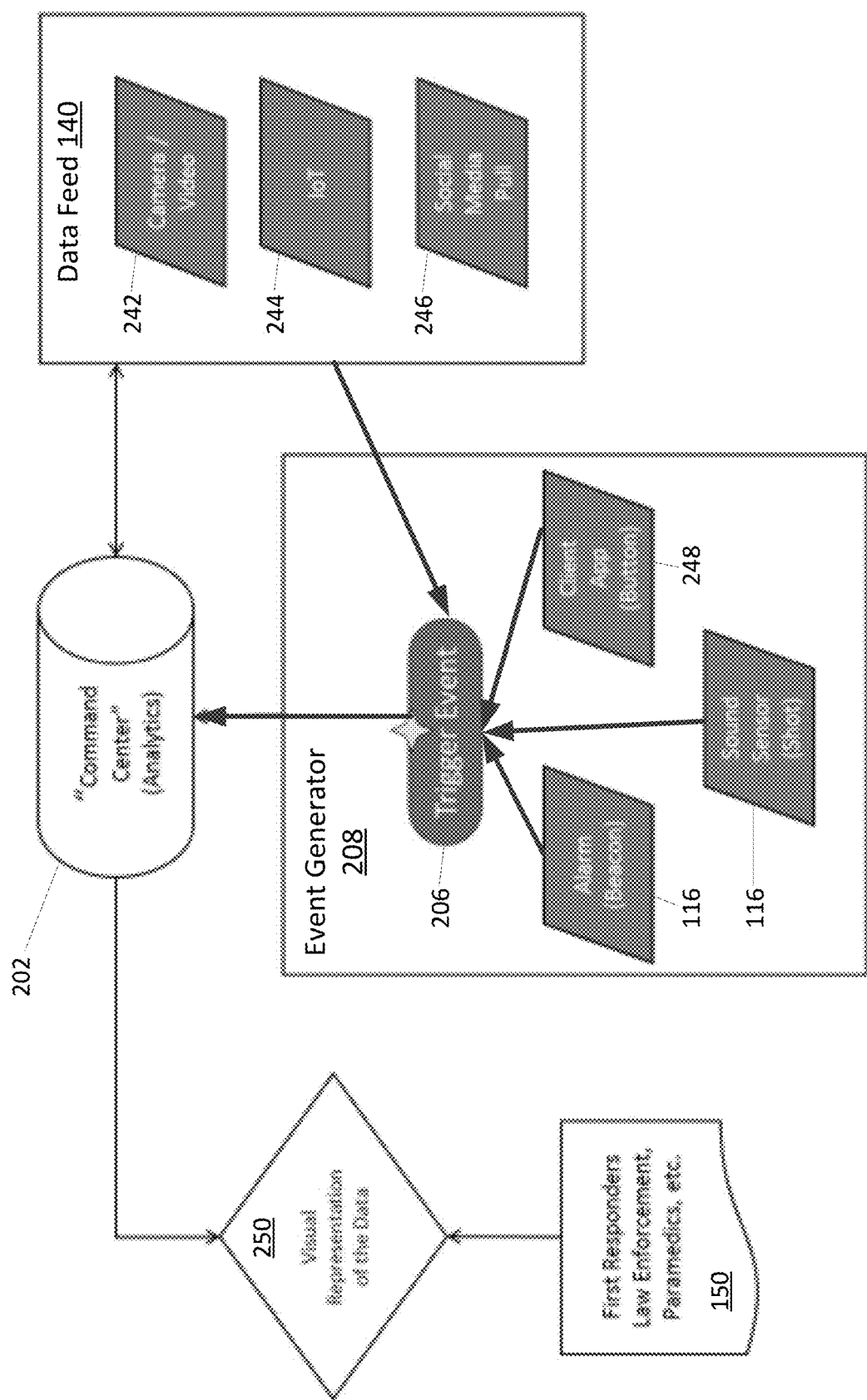
FIG. 2 illustrates a schematic view of an example public or emergency incident response system in which aspects of the present disclosure can be implemented is illustrated.

Referring now to FIG. 2, a schematic view of an example public or emergency incident response system 200 in which aspects of the present disclosure can be implemented is illustrated. For simplicity, the public or emergency response system 200 will be referred to herein as any of the public incident response system 200, the emergency incident response system 200, or the incident response system 200. In the example shown, the emergency response system 200 includes a command center 202, a plurality of data feeds 140, a plurality of event generator 208, a visual representation 250 of incident-related data, and emergency services 150.

In the example shown, the command center 202 can receive events 206 and data from data feed 140. The command center 202 comprises the analysis framework to output a holistic presentation of incidents from data and information received via the plurality of data feeds 140. The command center 202 can be implemented as the server-side of a server-client incident response solution model.

In the embodiment shown, the data feeds 140 includes a camera or video feed 242, an Internet of Things (IoT) feed 244, and a social media feed 246. In some embodiments, the data feed 140 can include any device or entity providing incident-related data to the command center 202. For example, the data feed 140 can also include beacons, such as the beacon 116, mobile devices such as the mobile devices 112 and 114, and any other device capable of sending data to and receiving data from the command center 202.

In the example shown, the event generator 208 includes the beacons 116, for example an "alarm" such as a fixed location emergency call box or a fixed location audio sensor, and a SmartApp 248 running on a mobile device such as the mobile device 112 or 114. In some embodiments, the event generator 208 can include a data feed such as the data feed 140 described above. In other embodiments, the event generator 208 can include any device or entity providing an event to the command center 202.

In the example shown, an event 206 is generated by one or all of the beacon alarm 116, the beacon audio sensor 116, and the SmartApp 248 via user-input, for example button press within the SmartApp 248 by a user to indicate the occurrence of an incident. The event 206 can include data such as an event location, and event time, and an event message. For example, the event location for the beacon audio sensor 116 is the fixed location of the beacon, the event time is the time recorded by the beacon upon detection and determination of audio related to an incident, e.g. a gunshot, and the event message is the associated data output by the beacon audio sensor in its native format. As another example, the event location for the SmartApp 248 is the GPS location of the mobile device, e.g. the mobile device 112, running the SmartApp 248 at the time a user, e.g. the user 120, provides input via the SmartApp 248 indicating the occurrence of an incident, e.g. a button press in the graphical user interface of the SmartApp 248. The event time for the SmartApp 248 is the time the user provides the user-input via the SmartApp 248, and the event message can be a pre-determined message in a native format, and can also be a human readable message such as text entered by the user via the SmartApp 248.

In the example shown, the event 206 is provided to the command center 202, which can categorize and group associated events 206. The command center 202 can additionally retrieve data from the data feeds 140 for further information related to the received events 206 and determined one or more incident. The command center 202 analyzes the events 206 and data from data feeds 140 to determine the existence and hazard level of one or more incidents related to the received events 206, and the relevant details of the one or more incidents. The command center 202 can output a visual representation 250 of the incident-related data, including the events 206 and the data from the data feeds 140, and any summary level data or information generated by the command center 202 based on the received events 206 and data from the data feeds 140. In some embodiments, the visual representation 250 of the incident-related data is a graphical user interface (GUI) displayed by a computing device running incident response application software.

In the example shown, the command center 202 can receive data from, and output data to, emergency services 150. In some embodiments, the command center 202 receives data from, and outputs data to, emergency data services 150 via the GUI 250.

Figure 3:
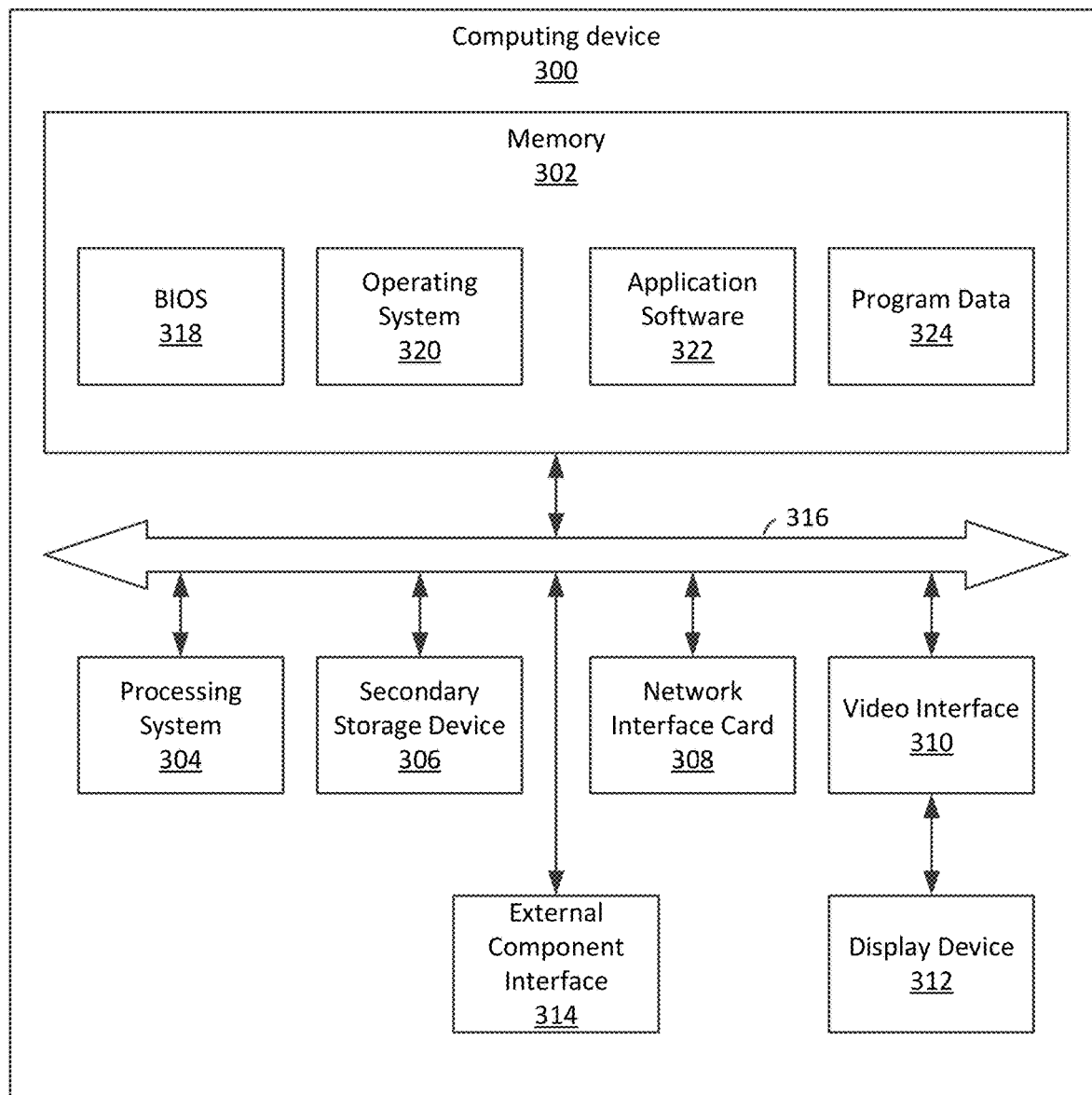
FIG. 3 is a schematic illustration of an example computing system in which aspects of the present disclosure can be implemented.

Referring now to FIG. 3, a schematic illustration of an example computing system in which aspects of the present disclosure can be implemented. The computing device 300 can represent, for example, a native computing system within which one or more of servers 132 can be implemented, or an implementation of a mobile device 112 or 114. In particular, the computing device 300 represents the physical construct of an example computing system at which a public or emergency incident response system or a mobile device or a client device, e.g. a desktop computer, could be established. In some embodiments, the computing device 300 implements virtualized or hosted systems, and executes one particular instruction set architecture while being used to execute non-native software and/or translate non-native code streams in an adaptive manner, for execution in accordance with the methods and systems described herein.

In the example of FIG. 3, the computing device 300 includes a memory 302, a processing system 304, a secondary storage device 306, a network interface 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more physical or logical processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface 308 enables the computing device 300 to send data to and receive data from a communication network. In different embodiments, the network interface 308 is implemented in different ways. For example, the network interface 308 can be implemented as an Ethernet interface, a token-ring network interface, a fiber optic network interface, a wireless network interface (e.g., Wi-Fi, WiMax, etc.), or another type of network interface. In some embodiments, the network interface 308 may be implemented as multiple network interfaces of the same or different type.

The video interface 310 enables the computing device 300 to output video information to the display unit 312. The display unit 312 can be various types of devices for displaying video information, such as an LCD display panel, a plasma screen display panel, a touch-sensitive display panel, an LED screen, a cathode-ray tube display, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, a wireless or headless video interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, any of the video interfaces discussed above in connection with video interface 310, and/or another type of interface that enables the computing device 300 to communicate with external devices. In various embodiments, the external component interface 314 enables the computing device 300 to communicate with various external components, such as external storage devices, input devices, speakers, modems, displays, media player docks, other computing devices, scanners, digital cameras, and fingerprint readers.

The communication medium 316 facilitates communication among the hardware components of the computing device 300. In the example of FIG. 3, the communications medium 316 facilitates communication among the memory 302, the processing system 304, the secondary storage device 306, the network interface 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300. The program data 324 can be used, for example, to perform emergency event detection and communication processes such as described herein and below, in connection with FIGS. 4-17.

Although particular features are discussed herein as included within a computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. Computer storage media does not include a carrier wave or other propagated or modulated data signal. In some embodiments, the computer storage media includes at least some tangible features; in many embodiments, the computer storage media includes entirely non-transitory components.

It is noted that, although in the embodiments of FIG. 3 shown the computing device 300 represents a physical computing system, the various computing resources, mobile devices, client devices, and servers of the present disclosure need not be directly implemented on a hardware-compatible system. Rather, such computing resources or servers could be implemented within a virtual computing system or virtual partition of a computing system. In some embodiments, the computing resources and/or servers of the present disclosure are implemented in a partitioned, multiprocessor environment, with the various partitions in which computing resources and/or servers reside being managed by a system virtualization software package.

In general, the mobile devices, client devices, computing resources, and servers of the present disclosure can be configured various ways, with registry settings selected to configure the computing resource to communicate according to an appropriate communication protocol.

Figure 4:
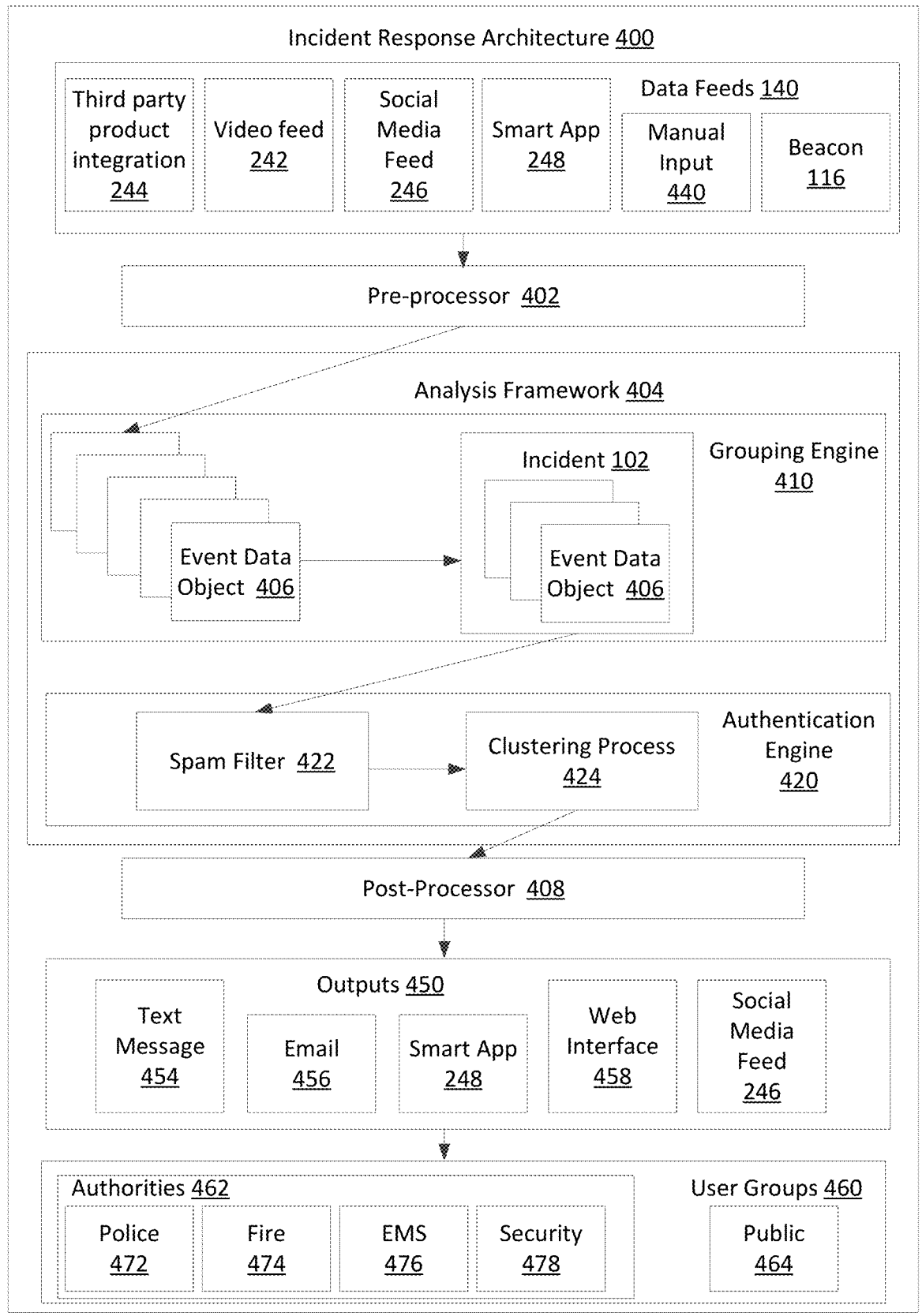
FIG. 4 is a schematic illustration of an example incident response architecture in which aspects of the present disclosure can be implemented

FIG. 4 is a schematic illustration of an example incident response architecture 400 in which aspects of the present disclosure can be implemented. In the example shown, the incident response architecture 400 illustrates several distinct, but connected, functionalities for implementing an incident response system such as the public or emergency incident response system 200. The incident response architecture 400 may be implemented, for example, using computing systems such as the computing system 300 described above in connection with FIG. 3.

In the example shown, the incident response architecture 400 illustrates several types of heterogeneous data feeds 140 that provide data and information consumed by an analysis framework 404, which generates several types of outputs 450 that are fed into several different tools and utilities that aid in the dissemination of information to different groups of people and users based on their role relating to an incident 102. In the example shown, the incident response architecture 400 includes data feeds 140, a pre-processor 402, an analysis framework 404, a post-processor 408, and outputs 450.

In the example shown, the data feeds 140 can include beacons 116, a SmartApp 248, manual input 440, camera and video feeds 242, third party product integration 244, and social media feeds 246. The beacons 116 can be any type of device that is in a fixed location with the ability to automatically contact security or emergency services personnel. For example, the beacons 116 can be emergency call boxes located on a school campus, fire alarms in a municipal building, or sensors such as ShotSpotter®. The SmartApp 248 can be dedicated application software that is configured to integrate with the incident response system 200, and in particular, the command center 202. The SmartApp 248 can include a variety of features such as push notifications, incident reporting, role-based access to information, and communication with security of emergency services, such as emergency services 150. In some embodiments, the manual input 440 can be any type of input that is manually entered into the incident response architecture 400 by a user. For example, manual input 440 can be entered by emergency services personnel through a dashboard, e.g. the dashboard 1002 within an interface 458, described in more detail below with respect to FIG. 10, or through the SmartApp 248. The camera and video feeds 242 can be any publicly available camera or video camera, for example, traffic or security cameras. In some embodiments, the camera and video feeds 242 can include mobile device cameras, for example, mobile phone and laptop computers running the SmartApp 248. The third-party product integration 244 can be any input provided to the analysis framework 404 by any third-party software or hardware product. For example, the third-party product integration 244 can be similar to a beacon without being in a fixed location, e.g. OnStar®. The social media feeds 246 can be any type of publicly or privately accessible feed that members of a group, or in some embodiments the public in general, publish information to and that is accessible to the public. In some embodiments, the social media feeds 246 can by any type of social media platform that private groups, or the public in general, follows and has access to for posting information. In some embodiments, social media feeds 246 include Facebook®, Twitter®, Instagram®, or specific Twitter® hashtags such as a campus security hashtag. In example implementations, the third party product integration 244 provides extensibility to the architecture 400, and allows for integration of various additional types of event data. As more types of event data is aggregated, incidents can more quickly be identified from events, and severity and specificity of events may be more quickly assessed.

In the example shown, the pre-processor 402 can normalize the data from the plurality of heterogeneous data feeds 140, each of which can output data in its native format. In some embodiments, the pre-processor 402 is configured to convert data from the data feeds 140 to a standardized analysis format and generate an event data object 406 including a human readable message describing the details of an event, e.g. the event 106, the event time, and the event location, along with any other relevant attributes. For example, the SmartApp 248 can report an event 106a including an event location in the form of GPS coordinates of the mobile device 112 running the SmartApp 248 at the time of the creation of an event 106a by the SmartApp 248, while a beacon 116 can report an event 106c including an event location in the form of a street address. The pre-processor 402 can be configured to convert the different types of event location data into a standardized event location type, e.g. GPS data, for forwarding the respective event data objects 406 corresponding to the events 106a and 106c reported by the different data feeds 140, e.g. the SmartApp 248 and the beacon 116.

In the example shown, the analysis framework 404 includes a grouping engine 410 and an authentication engine 420. The analysis framework 404 provides the logic, data processing, machine learning and artificial intelligence, and decision-making functionality of the incident response architecture 400. In the example shown, data flows though the grouping engine 410 and the authentication engine 420 in sequential order. Input from any of the data feeds 140 are converted to event data objects 406 and fed into the grouping engine 410, which combines related event data objects 406 into one or more incidents 102. The one or more incidents 102 are fed into the authentication engine 420 which is configured to determine the likelihood that the one or more incidents 102 are valid, and then generate output for different people, e.g. user groups, based on their role.

In some embodiments, the grouping engine 410 utilizes modern machine learning to sort, filter, tag, and classify the various incoming data inputs, e.g. the event data objects 406. The grouping engine 410 uses the event location, event time, and the human readable message of the event data objects 406 to generate and assign unique tags to each of the event data objects 406 via machine learning algorithms. For example, the grouping engine 410 can generate unique tags by parsing the human readable message of an event data object 406 and analyzing parsed keywords of the message using a Multinomial Naïve Bayes machine learning algorithm to determine the probability of the event data object 406 fitting into a predetermined set of tags, for example, "robbery", "fire", "assault", "shooting", etc. In some embodiments, "fitting into" a predetermined set of tags does not require a match between the tags and the parsed keywords, but rather whether the event 106 represented by the event data object 406 is likely fit the definition of one or more of the predetermined tags. In some embodiments, the grouping engine 410 utilizes training data sets as well as previous event data objects 406 to expand the set of predetermined tags.

In some embodiments, the grouping engine 410 can determine a sentiment of the event data objects 406. For example, the grouping engine 410 can use the parsed keywords from the human readable message of an event data object 406 to compare with a predetermined set of sentiment words, such as the AFINN-165 wordlist, which is a list of rated words associated with a valence number ranging between minus five and plus five. In the AFINN-165 word list, valence numbers that are less than zero have a negative connotation and valence numbers that are greater than zero have a positive connotation. For example, the word "robbed" has a valence number of "−2" and word "admired" has a valence number of "3." In some embodiments, the grouping engine 410 can extend the AFINN-165 wordlist with additional word and valence number pairs, and in other embodiments the grouping engine 410 can use a different predetermined set of sentiment words to determine the sentiment of an event data object 406.

In the example shown, the event data objects 406 are classified and grouped into one or more incidents 102 based on similarity of the assigned tags, the event location, the event time, and the sentiment of the event data objects 406. In some embodiments, the grouping engine 410 uses Naïve Bayes classifiers based on the event data objects' 406 event location and event time. For example, based on the Naïve Bayes classifiers, the grouping engine 410 determines the probability of the association of an event data object 406 with other event data objects 406 existing within an incident 102.

In some embodiments, the grouping engine 410 can assign a tag, or a series of related tags, to each of the one or more incidents 102. For example, the grouping engine 410 can assign the tag "robbery" to an incident 102, or can assign the related tags "armed" and "robbery" to an incident 102.

In some embodiments, a user can provide input determining that an incident 102 created by the grouping engine 410 is invalid. For example, the user can override the grouping engine's 410 determination of an incident 102. In some embodiments, the user's input invalidating the grouping engine's 410 determination of an incident 102 provides feedback from which the grouping engine 410 can be further refined. In other words, the incidents 102 and the event data objects 406 can act as training data for the machine learning algorithms of the grouping engine 410. In some embodiments, the grouping engine 410 returns the created or updated incidents 102 to the analysis framework 404 for authentication or for provision of additional data points that could be used to refine the authentication of any existing incidents 102.

In the example shown, the authentication engine 420 receives the incidents 102, or the event data objects 406, processed by the grouping engine 410. The authentication engine 420 then hardens itself against outside manipulation to help determine if the incidents 102 are legitimate. For example, the authentication engine 420 hardens itself to prevent event data submitted by users attempting to trick or abuse the evaluation of authenticity by the algorithms of the authentication engine 420. In the example shown, the authentication engine 420 hardens itself against outside manipulation by first confirming that an incoming event is not spam, and second by evaluating the determined incidents 102 to validate the similarity of all of the event data objects 406 associated with each particular incident 102. In some embodiments, an authenticity score is determined for each particular incident 102.

In the example shown, the authentication engine 420 includes a spam filter 422 and a clustering process 424. In some embodiments, the spam filter uses several attributes of each event data object 406 associated with a particular incident 102 and compares those attributes to all of the event data objects 406 that are associated with the incident 102 to determine whether the event data object 406, and the event data on which it is based, is spam. Spam can be any irrelevant, inappropriate, or indiscriminately sent message or event. In some embodiments, a spam filter score can be determined for each particular incident 102 being processed.

In some examples, the spam filter score has an initial value of 100% and the score is decremented based on the processing done during this step. In other words, the incident 102 being processed by the spam filter is initially assumed to be spam, e.g. have a score of 100%. Conversely, in some embodiments, an incident 102 with a spam filter score of 0% is assumed to be not spam. In some embodiments, if a data feed 140 is creating a high volume of events in a short period of time, then each subsequent event that originated from that data feed 140 will contribute to a deduction of the spam filter score for that particular incident 102 for which the events result in event data objects 406 associated with that incident 102. For example, if a large number of associated tweets using a campus security hashtag are received within a short period of time, e.g. resulting in a high frequency of related event data objects 406, subsequent tweets using that hashtag will contribute to a deduction of the spam filter score. This can be done by analyzing the event time and source of the event data objects 406.

In some examples, in addition to decrementing the spam filter score of an incident 102 by analyzing the frequency of event generation from a particular data feed 140 source, e.g. the high volume of events from a data feed 140 in a short period of time described just above, the spam filter 422 can analyze the event messages of the event data objects 406 associated with the incident 102 being processed by the spam filter 422. If the event message, e.g. the human readable message of the event data object 406, is similar to the event messages of existing event data objects 406 associated with the incident 102, then a deduction based on the overall quantity of event data objects 406 (e.g., a non-fixed value) will be deducted from the spam filter score. In some embodiments, the similarity between the event messages is determined by analyzing the Levenshtein distance between the words contained in the messages. The Levenshtein distance between two words can be defined as the minimum number of single-character edits required to change the first word into the second word. In some embodiments, the similarity between the event messages is determined by calculating the Levenshtein distance for every combination of words in the messages.

In some embodiments, additional criteria can be used to help determine the spam filter score. For example, data feeds 140 can be tracked to create a "credibility" multiplier. In addition, algorithms can be designed to determine the "credibility" of particular data feeds 140. Additionally, the event locations of the event data objects 406 can be used, based on the particular data feeds 140 generating the events, to determine if events created in different locations are meant to be a distraction from a different event or events.

In some embodiments, the clustering process 424 can use clustering algorithms to determine the validity of an incident 102 based on the individual event data objects 406 associated with the incident 102. The clustering process 424 can determine how related the event data objects 406 associated with the incident 102 are with each other. For example, a Variational Bayesian Gaussian Mixture (VBGM) clustering algorithm can be used by the clustering process 424 on the event data objects 406 associated with the incident 102. The clustering of the event data objects 406 can be visually represented using multiple axes each representing an attribute of each event data object 406, for example, event time, event location, and sentiment.

In some examples, the event locations of the event data objects 406 associated with an incident 102 can be normalized. For example, the coordinates of the event locations of the event data objects 406 can be processed to determine a center set of coordinates for the incident 102. The distance away from the center set of coordinates can be determined for each of the event data objects 406 and stored as a normalized value of the event locations of the event data objects 406. In some examples, the event time can be normalized in the same manner as the event locations and stored, for example, as an epoch or a UTC datetime stamp. In other examples, the event times do not need to be normalized.

In some embodiments, the attributes of each of the event data objects 406 associated with an incident 102 can be mapped onto the multiple axes representing the attributes of the event data objects 406. For example, each event data object 406 can be mapped as a point on a multidimensional (e.g., 3D) plot according to event time, event location, and sentiment as the axes. In some embodiments, there may be fewer or greater than three axes. In some examples, the density of the data points mapped onto the multiple axes can be determined. In some examples, a clustering score can be determined for each incident 102, and if the density is less than a predefined density threshold level, the clustering score for the incident 102 can be adjusted.

In some embodiments, the scores from filtering, such as the spam filter score from the spam filter 422, and a clustering score, such as the clustering score from the clustering process 424, can be combined to determine the authenticity score.

In the example shown, the post-processor 408 receives information about the determined incidents 102 from the analysis framework 404, determines what information to distribute to the outputs 450, generates notifications and alerts that can be sent to one or more user groups 460, and determines which users in the user groups 460 receive the outputs 450 and notifications and alerts. In some embodiments, the information received by the post-processor 408 includes incident 102 tags, an approximation of a location or locations, a geolocation or geolocations, an approximate cross street or cross streets, and an authenticity score of an incident 102. In some embodiments, the information the post-processor 408 receives can include the event data objects 406 including tags, sentiment, event location, event time, and information relating to the data feed 140 generating the event data object 406. In some embodiments, the information that the post-processor 408 receives can include raw input data from the data feeds 140, such as live video from the video or camera feed 242. In other embodiments, a user of the incident response architecture 400 can be provided access to a live video feed in connection with an incident 102 determined and output by the analysis framework 404, for example via a graphical user interface of the SmartApp 248 and interface 458, described below in more detail.

In some embodiments, additional attributes can be generated and associated with a determined incident 102. For example, the post-processor 408 can add a generic message string and both generic and detailed locations such as a postal or street address. The generic message string can be based on a configurable template with variables that are substituted for details of the incident 102. For example, the variables could be INCIDENT TYPE and INCIDENT_LOCATION and when placed in a template, would look like "${INCIDENT_TYPE} reported at ${INCIDENT_LOCATION} avoid this area. Police are responding". As part of the output component, these variables are replaced for the actual details of the incident 102.

In the example shown, the outputs 450 include text messages 454, emails 456, the SmartApp 248, an interface 458, and the social media feed 246. In general, detailed information about an incident 102 is not distributed to all user groups or the public for at least public safety and privacy reasons. Also, in the example shown, the user groups 460 that receive incident information via the outputs 450 include authorities 462 and the public 464. In general, a user group 460 can be any collection of individuals having a defined role in relation to a public or emergency incident 102.

In some embodiments, the text messages 454 can contain the high-level description of one or more incidents 102 and detailed information and links to the interface 458. In some embodiments, such links included in the text messages 454 received by a mobile device can launch the SmartApp 248 where the detailed information, images, and video feeds can be accessible.

In some embodiments, the emails 456 contain a high-level description of one or more incidents 102 in the subject line of the email 456, and detailed information and links to the interface 458, as well as links to specific image and video feeds, and the history of the one or more incidents 102 in the body of the email 456. Any additional emails 456 sent out after the initial email 456 would have the same subject so that users can filter and/or use the existing mail client tools for grouping them in any way they see fit. In some embodiments, customized scripts for printing the emails out on paper can be written.

In some embodiments, when an email is received by a user, the interface 458 can receive a notification informing a user using the interface 458 that one or more incidents 102 have been created and/or updated, or that the event data objects 406 associated with one or more of the incidents 102 have been updated.

In some embodiments, users can report events, e.g. the events 106, via the SmartApp 248 and also view detailed information about incidents 102 via the SmartApp 248. For example, push notifications can be received through the SmartApp 248 when new incidents 102 are created, or when event data objects 406 associated with an incident 102 are added or updated.

In some embodiments, the interface 458 can include a dashboard that displays information that is output by the incident response architecture 400. The interface can additionally include visualizations of the information that is output by the incident response architecture, for example, a heat map with all of the incidents 102 and associated event data objects 406 displayed on the heat map. The interface 458 can additionally include the social media feeds 246 and detailed statistics about the data collected for reporting, including information such as areas where certain incidents 102 occur based on the frequency of an event 106 and the time period during which the event 106 occurs such as during the day, week, month, etc. In some embodiments, the SmartApp 248 can also display such visualizations, heat maps, social media feeds 246, and detailed statistics.

In some embodiments, posts on the social media feed 246 can be configured to provide information to the public user group 464 and any private social media user groups. In some embodiments, the amount of information posted to the social media feed 246 platform would be more general and limited, for example, the high-level description and generic location of an incident 102 could be posted.

In some embodiments, the user groups 460 specify groups of specific individuals based on different permission levels assigned to those individuals. The outputs 450 can be configured to selectively provide information based on the user group 460. In some embodiments, the authorities user group 462 has full permissions, e.g. complete access to the data processed by the incident response architecture 400. The authorities user group 462 can receive notifications with all the information known about an incident 102 to increase their situational awareness and ability to adapt to the current and evolving circumstances. For example, the authorities user group 462 can be provided with real-time access to the incidents 102, including related details and the event data objects 406 associated with the incidents 102, as the event data objects 406 are created and processed, as well as any live data feeds 140, such as live video from the video feed 242. In some embodiments, the authorities user group 462 can view processed and raw event data objects 406 data through the dashboard of the interface 458. In some embodiments, the authorities user group 462 can view processed and raw event data objects 406 data through the SmartApp 248, e.g. via the GUI generated by the SmartApp 248 on a mobile device 112, for example.

In some embodiments, the user groups 460 can include individualized permissions based on individual users within a specific user group. For example, individual users within the authorities user group 462 can provide input to modify the incidents 102 and the event data objects 406 associated with the incidents 102 based on permissions granted to those particular individual user within the authorities user group 462, while other individuals within that same authorities user group 462 are not granted those same permissions and cannot modify the incidents 102 or associated event data objects 406.

In some embodiments, the authorities user group 462 can receive any combination of all the notifications that are available via the incident response architecture 400. For example, all users within the authorities user group 462 can receive text messages 454, SmartApp 248 push notifications, social media feed 246 posts, emails 456, and interface 458 notifications.

In some embodiments, the user groups 460 can be tiered and have a plurality of levels and specialty subgroups. In the example shown, the authorities user group 462 is further subdivided into the specialty user subgroups of police (or law enforcement) 472, fire (or fire department) 474, emergency medical services (EMS) 476, and security 478, e.g. campus security, mall security, or business security services, or mall security, within the authorities user group 462. In some embodiments, additional specialty subgroups of the authorities user group 462 includes any other personnel responsible for keeping people safe during an incident. In other embodiments, additional, fewer, or different subgroups can be included with the user groups 460.

In some embodiments, the specialty user subgroups can all receive different notifications based on their permissions, which can be based on the roles of each specialty user subgroup. For examples, the fire 474 specialty user group would only receive notifications about incidents 102 relating to fires, but would still have access to see all the incidents 102 in their domain, e.g. their area of responsibility or other defined area. One benefit of limiting notifications generated by the incident response architecture 400 based on user group 460 permission and role is to keep the communication channels of the specific user groups 460, such as the specialty user subgroups, focused on the tasks that those specific user groups 460 are responsible for while still allowing those specific user groups 460 visibility to a more holistic picture of the incidents 102 as other specific user groups 460 execute their respective tasks. For example, the fire 474 specialty user subgroup may not receive notification of a burglary incident 102 within that fire department's domain, but may be provided full permission and access to view the information output by the incident response architecture 400 relating to that burglary incident 102, for example, via the dashboard of the interface 458 or the SmartApp 248.

In some embodiments, the authorities user group 462 can manipulate data after it has been entered into the incident response architecture 400. For example, certain specialty user subgroups of the authorities user group 462 can have an elevated level of permission with respect to actively interacting with the event data objects 406 or the incidents 102 pertaining to a given domain, location, or area. Such specialty user subgroups with elevated permissions can validate or invalidate certain event data objects 406 or incidents 102 and archive certain incidents 102, e.g. record those certain incidents 102 as having been responded to or completed. For example, in the case of a car accident where multiple events 106 are reported detailing an injured individual being trapped in a vehicle, the underlying event data objects 406 and incident 102 data cannot be marked as addressed or handled solely by an EMS 476 or fire 474 specialty user subgroup because there may be tasks that both specialty user subgroups need to respond to regarding that incident 102. In this example, the fire 474 specialty user subgroup would need to complete the task of freeing the trapped individual from the vehicle and the EMS 476 specialty subgroup would need to complete the task of providing medical attention to the individual's injuries. As such, neither the EMS 476 specialty user subgroup nor the fire 474 specialty user subgroup would have unilateral permission to declare the car accident incident 102 as addressed or archived. However, in this example, once the police arrive at the scene and coordinate the overall response to the situation, then the police 472 specialty subgroup could archive the car accident incident 102 as having been addressed and completed.

In the example shown, the public 464 user group can generate events 106. The public 464 can do so, in general, through the data feeds 140, most particularly though social media feeds 246, third party product integrations 244, and the SmartApp 248. In general, the public 464 user group is given the most limited permissions and can only access general information about incidents 102 that the authorities 462 user group deems to be necessary and chooses to provide. Such information can include the type of incident 102 and a nonspecific location of the incident 102, such as a cross street or an address block number. In some embodiments, the public 464 user group can interact with the incident response architecture through the SmartApp 248 and the interface 458 in a limited manner, social media accounts, text messages, etc. In some embodiments, the public 464 user group can receive outputs 450 typically including more limited information than is output to the authorities user group 462. For example, emails 456 sent to the public 464 user group can contain a high-level description of the incidents 102 in the subject line and details about the incidents 102, such as a generic address in the form of a cross street or an address block number and a time, in the body of the email. The email 456 can also contain a link to social media feeds 246 that the public 464 user group can follow to stay up to date with the incidents 102. Additionally, text messages 454 sent to the public 464 user group can contain a high-level description of the type of incident 102 that the message is about, a generic address of the incident 102, a time, and a link to social media feeds 246 that a user can follow to stay up to date with the incidents 102. In addition, emails 456 and text messages 454 sent to the public 464 user group can also be a link in to open the SmartApp 248 on a public 464 user's mobile device to interact with according to the permission granted to the public 464 user group.

In some embodiments, the SmartApp 248 will receive push notifications of incidents 102 that are relevant to the users within the public 464 user group. The push notifications can contain a high-level description of the incident 102, and if the push notification is selected (e.g. the user taps the touch panel of the user's mobile device 112 in the active area of the push notification to make the selection) the SmartApp 248 can display the details of the incident 102 that the user has permissions to view. Such details can include a summary of the incident 102, a generic address, and a time. The SmartApp 248 can automatically be sent updates about the incident 102 through further push notifications.

In some embodiments, social media feed 246 posts can contain a summary of the incident 102 and a generic address of where the incident 102 occurred or is occurring. Part of the post to social media feed 246 can include a generic message that is automatically generated based on a template, such as a generic message string added to an incident 102 by the post-processor 408 as described above. In some embodiments, social media feeds 246 can act as inputs to, and a place for the public 464 user group to interact with, the incident response architecture 400 without needing the SmartApp 248 or the interface 458.

Continuing this components example, the mother uses the SmartApp 248 installed on her mobile device to submit an event to the solution. The created event has a message body of "I lost my child. His name is John Doe and I am Jane Doe his mother". The mother also attaches a picture of John Doe to the message. A notification is sent to all other smart device users informing them of the incident with a picture of the lost child. However, due to the limited privileges associated with this group the individuals receiving the alerts do not have access to the raw data associated with the event generated by the mother. Outbound notifications do not contain any sensitive information that the mall security officials deem inappropriate to be disseminated, such as specific names of the mother and her lost child. After receiving the notification of a lost child, members of the public are now aware of the ongoing situation. Several members of the public notice a child that appears to be lost and report it via social media to the solution. These social media posts contain geolocation data that the mall security officers use to search for the child. Once the mall officials arrive at the specified location, they can locate the lost child. Upon the reunification of the child and his mother all members of the Public group receive an automatic message via an email, text message, or SmartApp 248 notification, informing them that the lost child incident has been resolved.

An exemplary use case scenario of the incident response architecture 400 is described next. In this example, the incident response architecture 400 is implemented in a command center 202 deployed in a mall. In this example, the mall security officers are the authorities 462 and the shoppers and other store employees are the public 464. Some members of the public 464 have the SmartApp 248 installed on their mobile devices 112, and some members of the public 464 follow social media feeds 246 associated with the mall. Other individuals at the mall do not have any direct contact with the incident response architecture 400. In this example, a mother and child are working their way through a particularly crowded food court in the mall when the child lets go of his mother's hand and gets lost in the large crowd. Subsequently, the mother is not able to find her child and she starts to ask other people at the mall for help.

Continuing with the example, the mall security officers receive an email 456 telling them that a new incident 102 has been identified by the analysis framework 404. Since the mall security is in the authorities 462 user group, they receive a link to the dashboard hosted in the interface 458 within their email notification which grants them access to all of the data visualization and analysis outlined in the interface 458. While examining the raw event 106 data associated with the incident 102, the mall security officers notice a picture of a lost child and identify that the incident 102 tag is "Lost Child". At first, the authenticity associated with the incident 102 is low, but it quickly increases as more similar events 106 are reported via social media feeds 246 and users of the SmartApp 248. Accordingly, a security official is dispatched to the reported location of the incident 102. At that point, the security official is able to locate the child and safely return him to his mother. Subsequently, due to the elevated permissions of the mall security officials to mark the incident 102 as addressed or archived, automatic notifications are sent out to the public 464 user group via social media feeds 246, text messages 454, emails 456, and push notifications via the SmartApp 248 informing users that the incident 102 has been resolved and that no further actions are needed.

Figure 5:
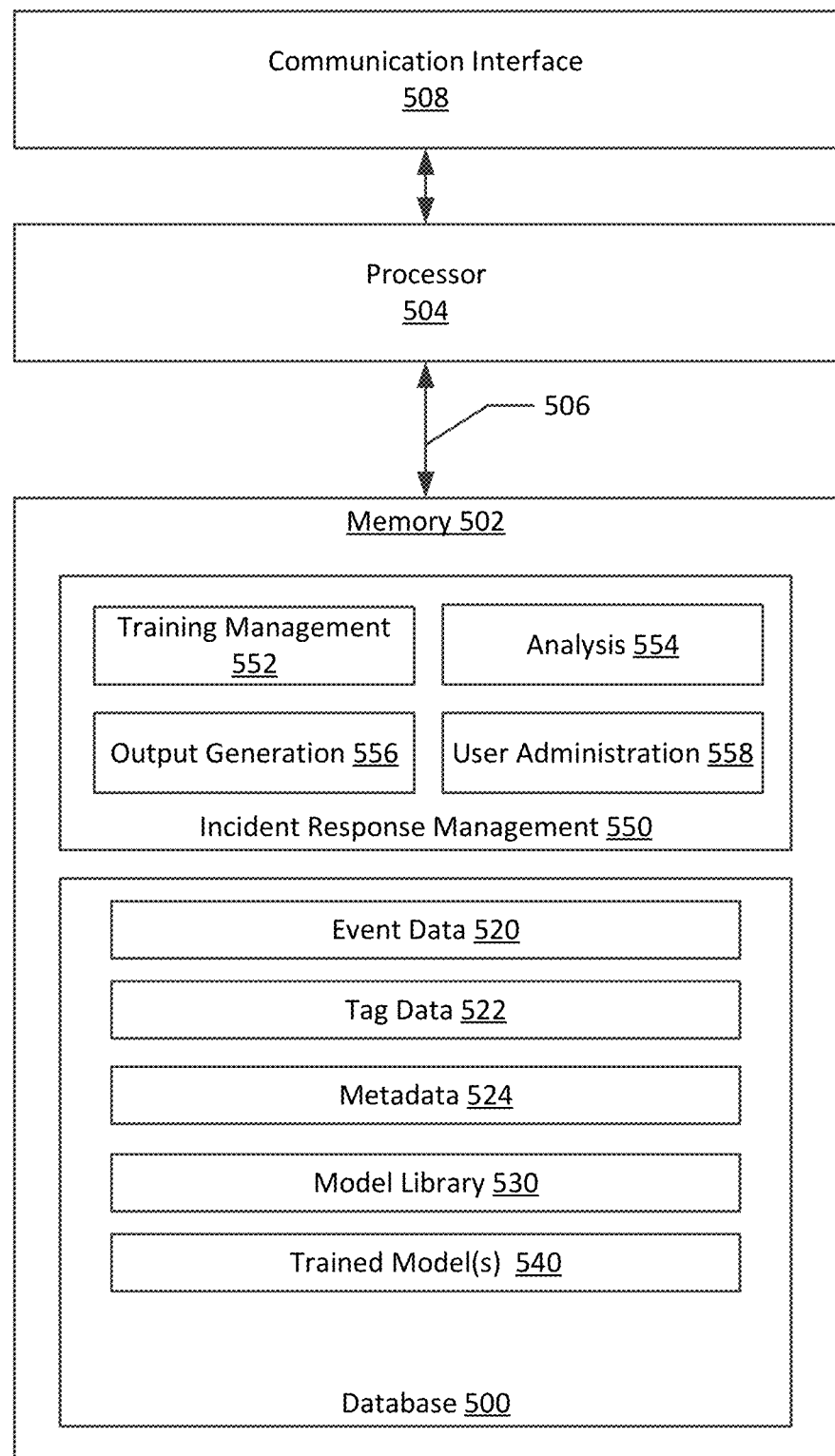
FIG. 5 is a schematic illustration of an example computing system useable within the public or emergency incident response environment as an emergency incident response server 132, in which aspects of the present disclosure can be implemented.

FIG. 5 is a schematic illustration of an example computing system useable within the public or emergency incident response environment 100 as an emergency incident response server 132, in which aspects of the present disclosure can be implemented. The server 132 can represent, for example, a native computing system. In particular, the server 132 may represent the physical construct of an example computing system at which a public or emergency incident response system, for example the command center 202, can be implemented. In some embodiments, the server 132 is implemented as one or more virtualized or hosted systems, and executes one particular instruction set architecture while being used to execute non-native software and/or translate non-native code streams in an adaptive manner, for execution in accordance with the methods and systems described herein.

In the example shown, server 132 hosts a database 500, which stores event data from the data feeds 140. The server 132 can, as noted above, generate outputs and perform analysis that integrates information from the data feeds 140.

In the example shown, the database 500 is stored in a memory 502 alongside an incident response management tool 550. A processor 504 is communicatively connected via a bus 506 to the memory, and executes instructions stored in the memory, including instructions defining the incident response management tool 550. A communication interface 508 allows the server 132 to communicate with other devices, e.g., to receive the event data and provide output to other devices.

In the embodiment shown, the database 500 stores event data 520, tag data 522, and metadata 524. The event data 520 generally includes the events 106 sent to the database 500 from one or more data feeds 140. The event data 520 therefore generally corresponds to event data objects 406 generated from events 106 that are received from a plurality data feeds 140.

The tag data 522 includes one or more tags associated with at least some of the event data. The tags included in the tag data 522 may be associated with the event data objects 406, or may be associated with the incidents 102. For example, a tag associated with an event data object 406 may indicate a "fire" event 106 generally, and may additionally indicate an event time, an event location, and an event sentiment. In the example embodiments, and as discussed above, tags included in the tag data 522 may be associated with an incident 102 to indicate a "fire" incident 102 generally, and may additionally indicate an incident time, an incident location, and an incident sentiment. Additionally, in some embodiments tags may be automatically associated with particular event data objects 406. In such embodiments, data analysis may be performed to identify features in the event data objects. Such data analysis may be based on, for example, providing event data objects 406 to a trained model 540 of event data objects which can then suggest one or more tags that may be appropriate to be associated with a particular event data object 406.

The metadata 524 represents other information that may be associated with specific event data objects 406. For example, the metadata 524 may include, for example, a time and date of event data objects 406 creation, and other information inherent in the event data objects 406, for example, the data feed 140 that generated the event data object 406, the location of the data feed 140 that generated the event data object 406, etc. Additionally, metadata 524 may include additional information that a user generating the underlying event 106 may wish to associate with the event data object 406, for example, a human readable message containing details relating to the event 106.

In accordance with some embodiments, and to support machine-learning based data analysis of the event data objects 406 and the incidents 102, the database 500 stores, in the example shown, a model library 530 and one or more trained models 540. Generally, the model library 530 stores one or more possible machine learning models that may be selected for use in analyzing the event data objects 406 and the incidents 102 for purposes of automatically identifying features in those event data objects 406 and incidents 102.

Example models that may be selected include, for example deep learning models, regression models, Multinomial Naïve Bayes models, Naïve Bayes classifiers, and Variational Bayesian Gaussian Mixture (VBGM) models, although other models may be utilized as well.

The trained models 540 can include one or more models that are useable to group the event data objects 406. For example, a model selected from the model library may be trained with a set of training data drawn from the event data 520, tag data 522, and metadata 524 to identify similarity features of the event data objects 406.

In some examples, a selected model is trained on event data objects 406 for known incidents 102. In other examples, two or more models are trained on event data objects for known incidents 102, and either a composite model may be formed, or a best candidate may be selected from the trained models 540.

In accordance with the present disclosure, each of the various types of data 520-524 can be used in various combinations for training a model which can in turn be used to automatically identify groupings of event data objects 406. This may include automatically suggesting potential tags associated with features detected in the event data objects 406, for optional confirmation by a user. Such automatically identified features may be the basis for adjusting association of an event data object 406 with a particular incident 102, or determining a hazard alert level of an incident 102.

Still referring to FIG. 5, the incident response management tool 550 includes a training manager 552, an analysis module 554, an output generator 556, and a user administration tool 558.

The training manager 552 manages selection of training data and selection of a model to be trained from the database 500 for purposes of generating trained models 540. In example embodiments, the training manager 552 can periodically assess and retrain models included among the trained models 540, or replace trained models with improved trained models, according to predetermined criteria (e.g., age or accuracy of the model, or amount/type of training data used).

The analysis module 554 accesses one or more trained models and one or more event data objects 406 or incidents 102 to be analyzed, and provides the event data objects 406 to the trained models for purposes of generating one or more suggested feature tags for that event data object 406, as noted above. The analysis module 554 can perform, for example analysis of event data object 406 attributes and features, and adjust additional descriptive data associated with the event 106, for example by detecting a type of event data object 406 and an event sentiment of the event data object 406, etc. Additionally, an estimated hazard alert level can be adjusted by the analysis module 554 as well in response to detected features or a detected identification of the event data objects 406.

The output generator 556 generates incidents 102 that can be accessed by users. The incidents 102 can include detailed information about the incidents 102 and the associated event data objects 406 including, but not limited to, the types of information described above as being stored in database 500. Such reports may be made available to users of the incident response architecture 400 having a predetermined set of permissions defined using a user administration tool 558.

The user administration tool 558 generally allows users access to input or access data in the database 500. For example, the user administration tool 558 controls access rights for authorities 462 user groups and the public 464 user group to be able to access information from the database 500 or modify information in the database 500 as to event data objects that may be associated with incidents 102. Various other user roles may be defined and enforced via user account-based authentication as well.

Referring to FIG. 5 generally, it is noted that although certain functionality is described herein, other types of functions could be performed at server 132 as well. For example, some or all of the image processing techniques described above in connection with FIGS. 8-17 may be performed at a server, as an alternative to performing such operations at a mobile device 112 useable in connection with the incident response architecture 400 described herein.

Figure 6:
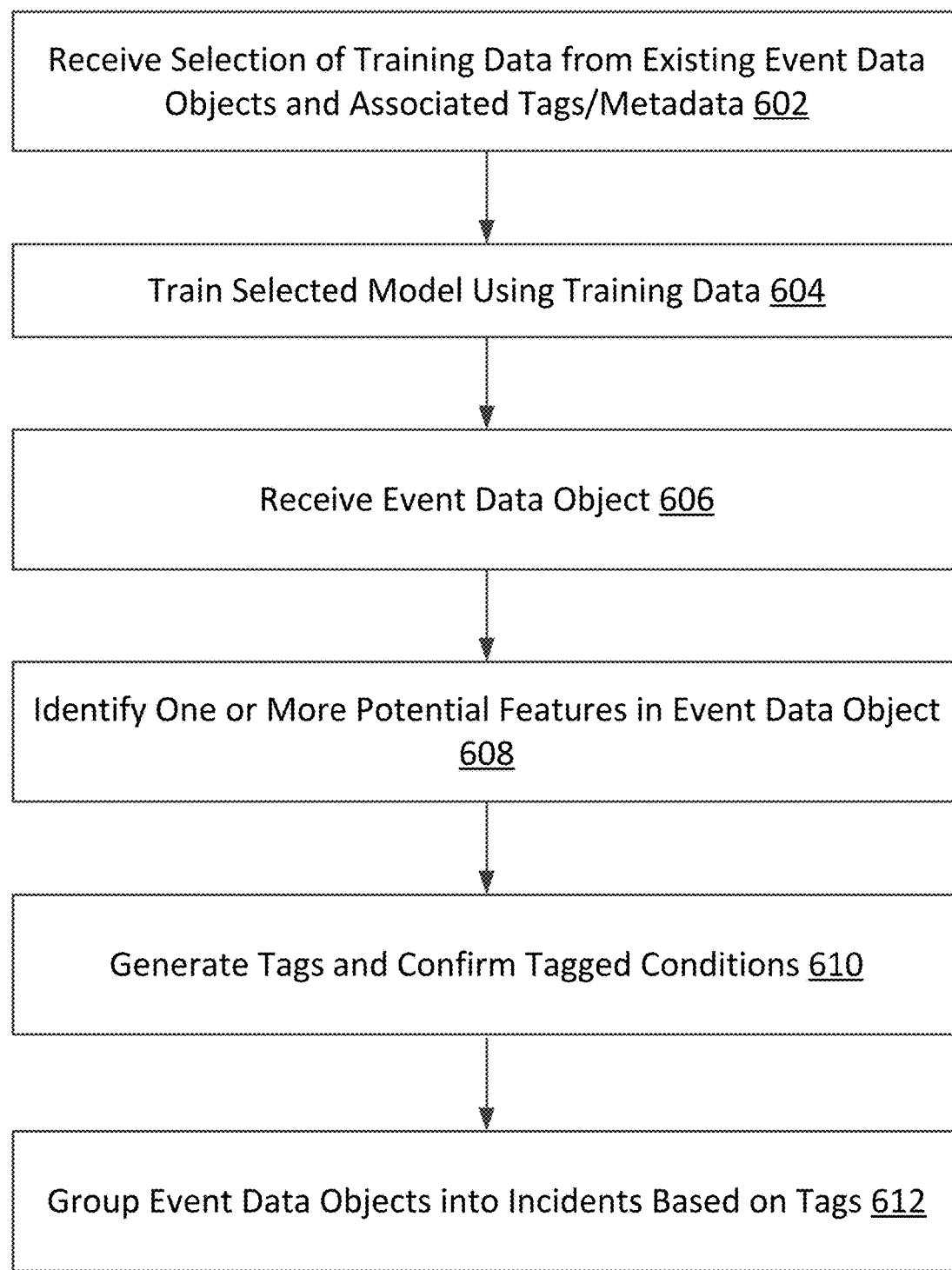
FIG. 6 is a flowchart of a method for analyzing event data objects and incidents, according to an example embodiment of the present disclosure.

FIG. 6 is a flowchart of a method 600 of analyzing event data objects 406 and incidents 102, according to an example embodiment. The method 600 analyzes a subset of available event data objects 406 and incidents 102 and associated data (e.g., the data described above in connection with database 500) to allow features to be detected in subsequently-analyzed event data objects 406 and incidents 102.

In the example shown, the method 600 includes receiving a selection of training data from the data in the database (step 602). The selection of training data can include selecting all or some portion of the available data from existing, tagged event data objects 406 and incidents 102. A machine learning model may then be selected from the model library 530 and trained using the selected training data (step 604), providing a trained model.

Upon completion of model training, the server 132 may receive an event data object 406. Based on the received information, one or more potential features are identified using a selected trained model (step 608). As noted above, a variety of features can be identified in association with the event data object 406. In some examples, the trained model can also be used to validate incidents 102.

In the embodiment shown, the identified features can be used to automatically generate tags that are to be associated with the event data object (step 610). Optionally, those tags that are automatically generated may be presented to a user (e.g., by transmitting the tags and optionally a copy of the event data object 406 back to a mobile device or computing device of that user) for confirmation that the proposed tags are correct or appropriate. In other examples, the automatically generated tags are associated directly with the event data object 406 with no confirmation required. In addition, other information regarding an incident 102 may be stored in the database 500 based on detection of attributes of the incidents 102 from the event data objects 406. Once tags are associated with event data objects, and optionally confirmed, the method 600 may proceed to group event data objects into incidents based on the tags (step 612).

Accordingly, upon completion of method 600, a model is formed that may be used in conjunction with other event data (e.g., subsequently-received event data objects) to validate accuracy of the generated model, and/or with real-time or near real-time event data to detect likely incidents that may be occurring at that time. It is noted that method 600 may be performed on occasion or periodically (e.g., on a daily, weekly, or monthly basis) based on new data that may be available, to improve accuracy of the model that is generated. That model can then be used for some subsequent period of time across event data that is received, and optionally compared against previously-generated or co-existing models.

Referring to FIGS. 5-6 generally, it is noted that the server-based processing methods described herein have a number of advantages over existing incident response systems, in particular when used in conjunction with the systems and apparatuses described above. For example, emergency services personnel may be provided with a holistic assessment of an incident in which information from a wide variety of data sources has been integrated to enable responders to quickly assess the situation and how to appropriately respond. Accordingly, not only are responses to emergency incidents improved, but the wide variety of information data sources allow the system to be extended to non-emergency incidents such as public incidents. Furthermore, as models improve at accurately detecting features (as more training data becomes available), the accuracy of authentication of incidents will increase. With respect to application users who are part of a user group, the features may, for example, be used to provide appropriate and timely notification of public or emergency incidents so a wide variety of user groups can act quickly according to their role, e.g. first responders can assess and respond to threats in a quicker and safer manner, and the public near the incident can determine how best to move to safety. Other advantages are apparent as well throughout the application.

Figure 7:
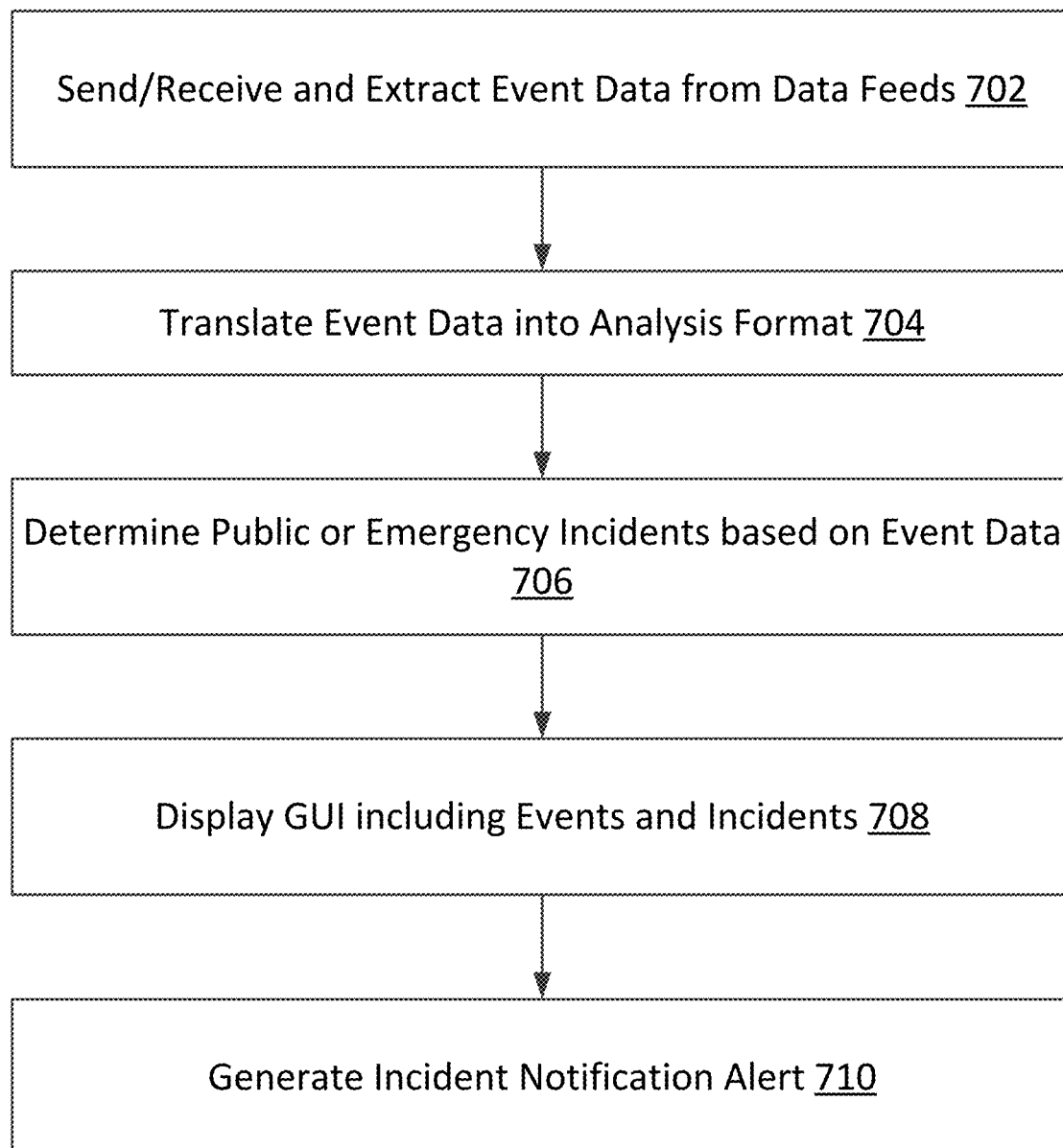
FIG. 7 is a flowchart of a method for determining a public or emergency incident, according to an example embodiment of the present disclosure

FIG. 7 is a flowchart of a method 700 for determining a public or emergency incident, according to an example embodiment of the present disclosure. The method 700 can be performed, for example, by a server 132.

In the example shown, data is received via a plurality of data feeds 140, and event data, such as data from events 106, is extracted from the received data at step 702. In an example embodiment, event data is extracted from data sent directly to the server 132 running software implementing the incident response architecture 400 from other devices, e.g. a mobile device 112 running a SmartApp 248 or another device with access to a dashboard 1002 via an interface 458. Alternatively, the server 132 can receive a constant stream of data, for example from a social media feed 246, and extract relevant event data from the constant stream of data using any techniques, including machine learning techniques. In some embodiments, the extracted event data 106 can be in the native format of the data feed 140 from which the event data 106 was extracted.

The event data is translated into an event data object 406 having a standardized analysis format at step 704. The standardized analysis format can include a human readable message describing the details of an event 106, an event time, and an event location, along with any other relevant attributes.

At step 706, a public or emergency incident 102 is determined based on the event data objects 406 generated at step 704. Determining the existence of a public or emergency incident 102 can include determining an association, or associations, between a plurality of events 106 based on event data objects 406 and grouping events 106 based on the determined association or associations. For example, data objects 406 may have similar or related keywords describing the details of an event 106, or have event times within a certain period of time, or have event locations within a certain area, or be associated by any combination of event description details, time, and location, source generating the event data, or any other attributes of the event data.

Determining the existence of a public or emergency incident 102 can further include determining a priority level of the incident from among a plurality of predefined priority levels. Predefined priority levels can be of any type and form, for example a set of numerical priority levels 1, 2, 3, 4, where 1 and 4 can be most or least urgent, and the number of numerical priority levels can be more or fewer than 4. Predefined priority levels can be a set of colors, e.g. red, yellow, green, or designated by descriptive phrases or words such as critical, urgent, serious, shots fired, etc., or any other type or form.

At step 708, the public or emergency incident 102 can be displayed, for example within a graphical user interface displayed on a display of a computing device 300. An example of such a graphical user interface is described in more detail below with respect to FIG. 10.

At step 710, an incident notification alert is generated. In the embodiment shown, the alert can be generated by the command center 202 running the incident response architecture 400 on a computing device 300 and be sent to any computing device 300, for example, mobile devices 112 and 114 running the SmartApp 248 and subscribing to receive alerts from the incident response architecture 400. The incident notification alert can be any form or alert, including a push notification, a text message, an email, and a social media post. The incident notification alert can be sent to all user groups 460, or can be limited to specific user groups, e.g. police 472. The incident notification alert can also be sent to one or more, or all, user groups and contain different information in the alert depending on user group.

Figure 8:
FIG. 8 is an image of a user interface screen for generating event data, according to an example embodiment of the present disclosure.

Referring now to FIGS. 8-17, various user interfaces are depicted which are useable on user devices of various types (e.g., mobile devices or other computing systems). FIG. 8 is an image of a user interface screen 800 for generating event data 106, according to an example embodiment of the present disclosure. The user interface screen 800 is an example of a screen that can be used on a mobile device to perform the method step 702 further described above and illustrated in FIG. 7. In the embodiment shown, the user interface screen 800 is a mobile device application GUI, for example the SmartApp 248, and includes the buttons 802, 804, 806, and 808 which the user 120 can touch, e.g. using a mobile device having a touch screen enabled to receive touch input and displaying the user interface screen 800. The buttons 802, 804, 806, 808 allow a user to quickly select a type of incident that is observed. The user interface screen 800 also includes a text box 810 configured to receive text input entered by a user, for example, a human readable message describing details of an event 106.

Figure 9:
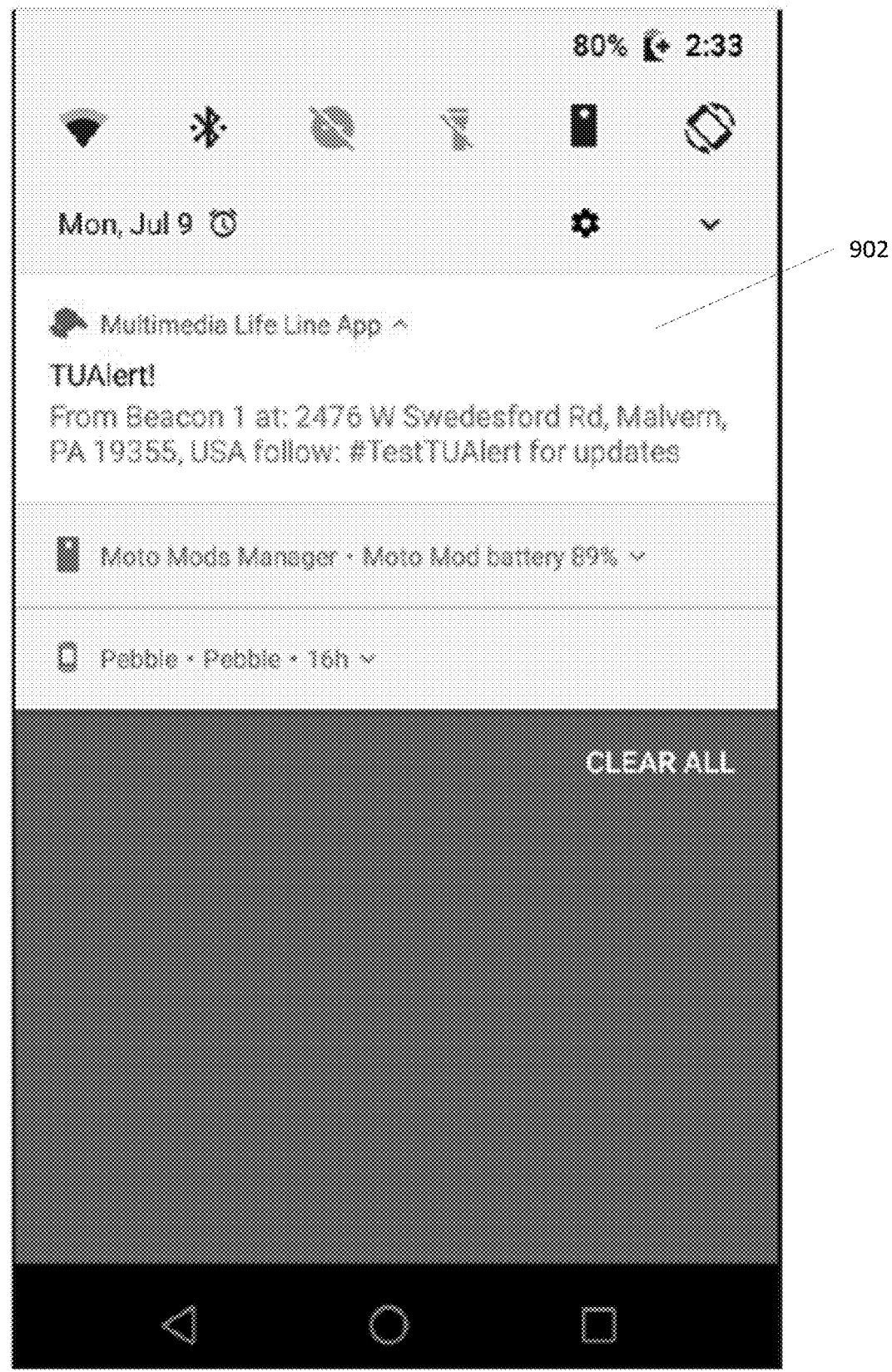
FIG. 9 is an image of a user interface screen for receiving alerts and notifications, according to an example embodiment of the present disclosure.

FIG. 9 is an image of a user interface screen 900 for receiving alerts and notifications, according to an example embodiment of the present disclosure. The user interface screen 900 is an example of a screen that can be used to perform the method step 710 further described above and illustrated in FIG. 7. In the embodiment shown, the user interface screen 800 is a mobile device application GUI, for example the SmartApp 248, and includes the push notification 902 which contains an alert message relating to a determined incident 102.

Figure 10:
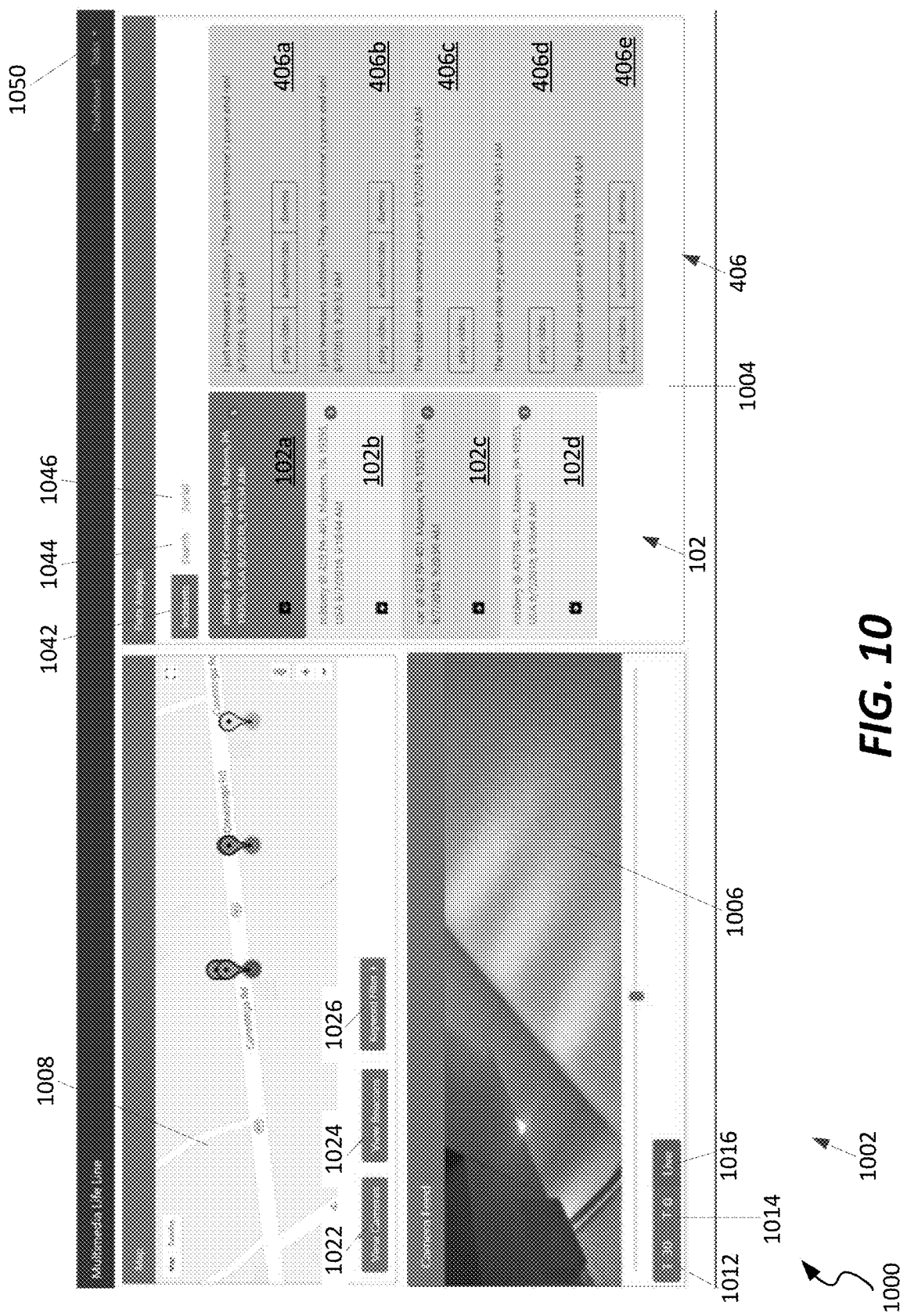
FIG. 10 is an image of a user interface screen for receiving events and user input and generating notifications, according to an example embodiment of the present disclosure.

FIG. 10 is an image of a user interface screen 1000 for receiving events 106 and user input and generating notifications, according to an example embodiment of the present disclosure. In some embodiments, the user interface screen 1000 includes a dashboard 1002, and can be displayed via an interface 458, and in other embodiments the user interface screen 1000 and dashboard 1002 can be displayed via software running on a computing device. In some embodiments, the dashboard 1002 can be displayed via the SmartApp 248.

In the example shown, the dashboard 1002 includes a data analysis window 1004, a video feed window 1006, and a map window 1008. In the example shown, the data analysis window 1004 includes an Incidents button 1042, a Search button 1044, and a Social button 1046. When the Incidents button is selected, as illustrated in FIG. 10, the data analysis window 1004 can display incidents 102 and associated event data objects 406. In the example shown, the data analysis window 1004 includes the incidents 102a-d, with the incident 102a selected as indicated by its being highlighted. Each incident 102 can include a description, a location, a data and time, and the number of events associated with each incident 102. For example, the incident 102a includes a "robbery" description, a street address, and a data and time, and a red badge icon indicating that five events have been associated with the incident 102a. In some embodiments, the incidents 102 can be displayed in the order in which they are authenticated as incidents, either by the analysis framework 404 or manually by a user, for example, the most recent incident 102 can be displayed as either the top or bottom of the list of incidents 102. In some embodiments, the incidents 102 can be color coded, for example, new incidents that have not been viewed or selected can be highlighted yellow (or any predetermined color depending on user preferences), and incidents that have been viewed or selected can be highlighted green (or any predetermined color depending on user preferences).

In the embodiment shown, the event data objects 406 associated with the incidents 102 can also be displayed within the data analysis window 1004. For example, the incident 102a can be highlighted as illustrated, and a list of the associated event data objects 406a-e can be displayed. In the example shown, the event data objects 406a-e each can include an event message, and event date and time, and buttons for receiving user input including launching a video captured by the data feed 140 that generated the event data object 406 or for launching a live video feed from the data feed 140 that generated the event data object 406, authenticating the event data object, or dismissing the event data object 406. In some embodiments, the event data objects 406 can also be displayed in the order in which they are received, such as the most recent event data object being displayed at the top or bottom of the list of event data objects 406. In some embodiments, the event data objects 406 can be color coded, for example, event data objects 406 that have not been authenticated can be highlighted red, and event data objects 406 that have been authenticated can be highlighted green (note that any color for the highlighting can be used depending on user preferences).

In the example shown, the map window 1008 can display the locations of the event data objects 406 associated with the selected incident, for example, the five event data objects 406a-e of the selected incident 102a. The locations of the event data objects 406 are displayed as "pins" on a street map. In some embodiments, the map could be a satellite map, contour map, 3D map, or any other type of map. In some embodiments, the pins can be color coded to indicate the device type from with the event data object 406 has been generated, for example, red is from a mobile device, blue is from a beacon, and yellow is from a member of the public who called in the event. In some embodiments, the map window 1008 can indicated which event data objects 406 are new, such as by a pin that is displayed as bouncing up and down at the event data object 406 location on the map. In some embodiments, the map window 1008 can indicate which event data objects 406 have been dismissed, such as by a pin that has stopped bouncing up and down at the event data object 406 location on the map.

In some embodiments, the map window 1008 can include a heat map. For example, for multiple event data objects 406 the shading, size, or color saturation of an area of the map near the pins indicating event data objects 406 could change or increase depending on the number of event data objects 406 associated with that incident 102 at that location. In some embodiments, each incident 102 can have its own color for the heat map to aid in visibility of the different incidents occurring at or near the same time, e.g. to aid in assessing the situation visually "at a glance."

In some embodiments, when an event data object 406 is received, the camera feed window 1006 can display a live video stream of the camera closest to the incident location. In the example shown, the camera feed window includes a T-30 button 1012, a T-0 button 1014, and a Live button 1016, indicating user options for viewing video captured by the camera closes to the incident 30 minutes prior to the incident (the T-30 button 1012), video of the incident (the T-0 button 1014), and a live feed from the camera (the Live button 1016). In some embodiments, the dashboard 1002 includes options for scrubbing through the video playback in order to find relevant video footage quickly.

In the example shown, the map window 1008 includes a View Cameras button 1022, a View Beacons button 1024, and a Keyword Filter button 1026 indicating user options for altering map display. These buttons are described in further detail below with respect to FIGS. 11-12.

Figure 11:
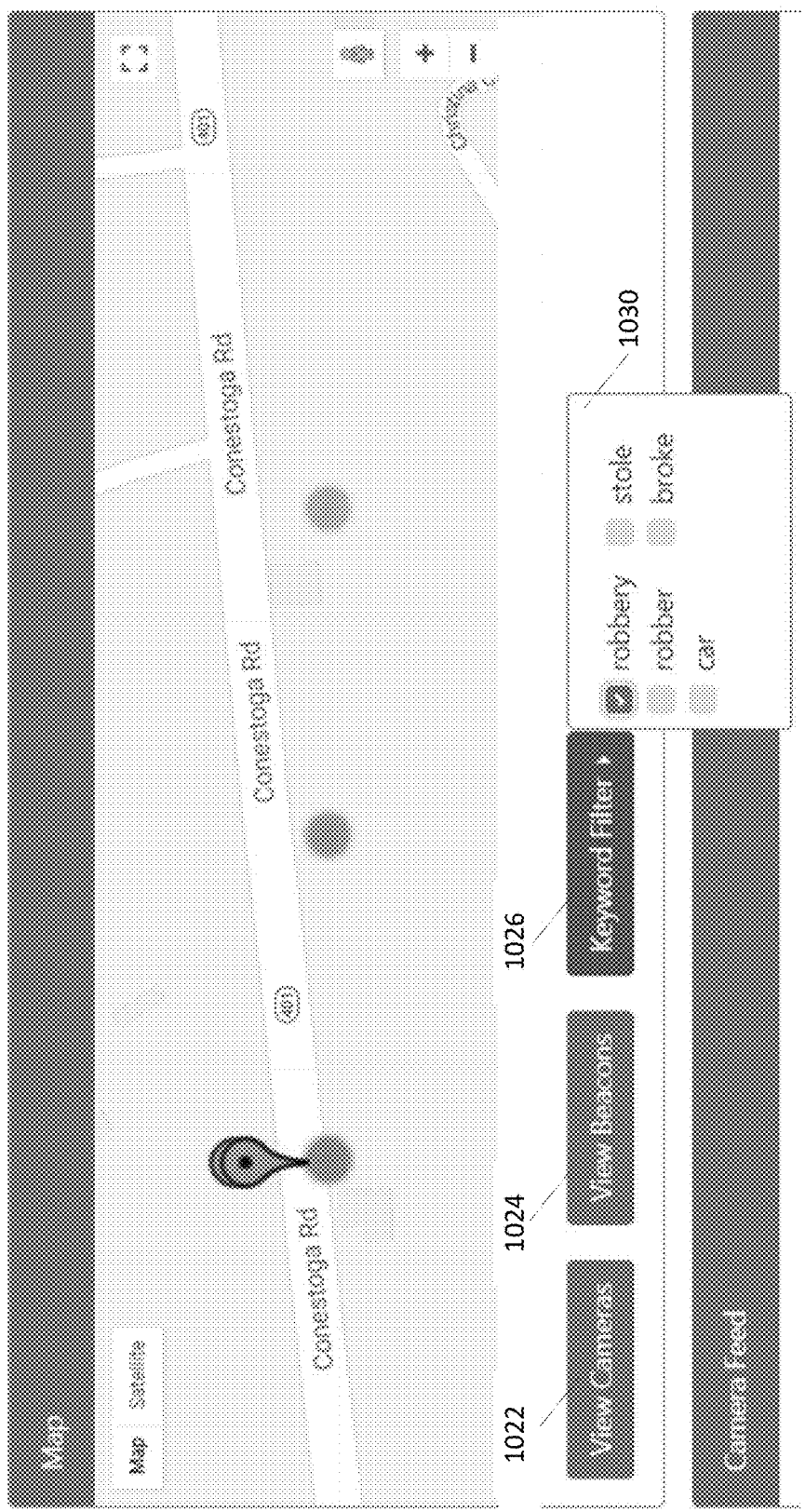
FIG. 11 is an image of an example map window within the dashboard of a user interface screen, according to an example embodiment of the present disclosure.

FIG. 11 is an image of an example map window 1008 within the dashboard 1002 of a user interface screen 1000, according to an example embodiment of the present disclosure. In the example shown, the Keyword Filter button 1026 has been selected, activating the keyword dialog box 1030, in which. In the embodiment shown, the user selection of the Keyword Filter button 1026 activates the keyword dialog box 1030, which is populated with keywords extracted from the event messages of the event data objects 406 by the analysis framework 404, and associated with the incidents 102. When a user selects one or more keywords, the map window 1008 is updated to show only pin indicators associated with the keywords chosen. In the example shown, the "robbery" keyword is selected, as indicated by the checked checkbox next to the "robbery" keyword, and only the pin indicators associated with event data objects 406a-b having the selected keyword are shown in the map window 1008 because only those events "pass" the keyword filter. In some embodiments, if no keywords are selected, the keyword filter is "off" and all of the event data objects 406 are displayed, via pin indicators, in the map window 1008.

Figure 12:
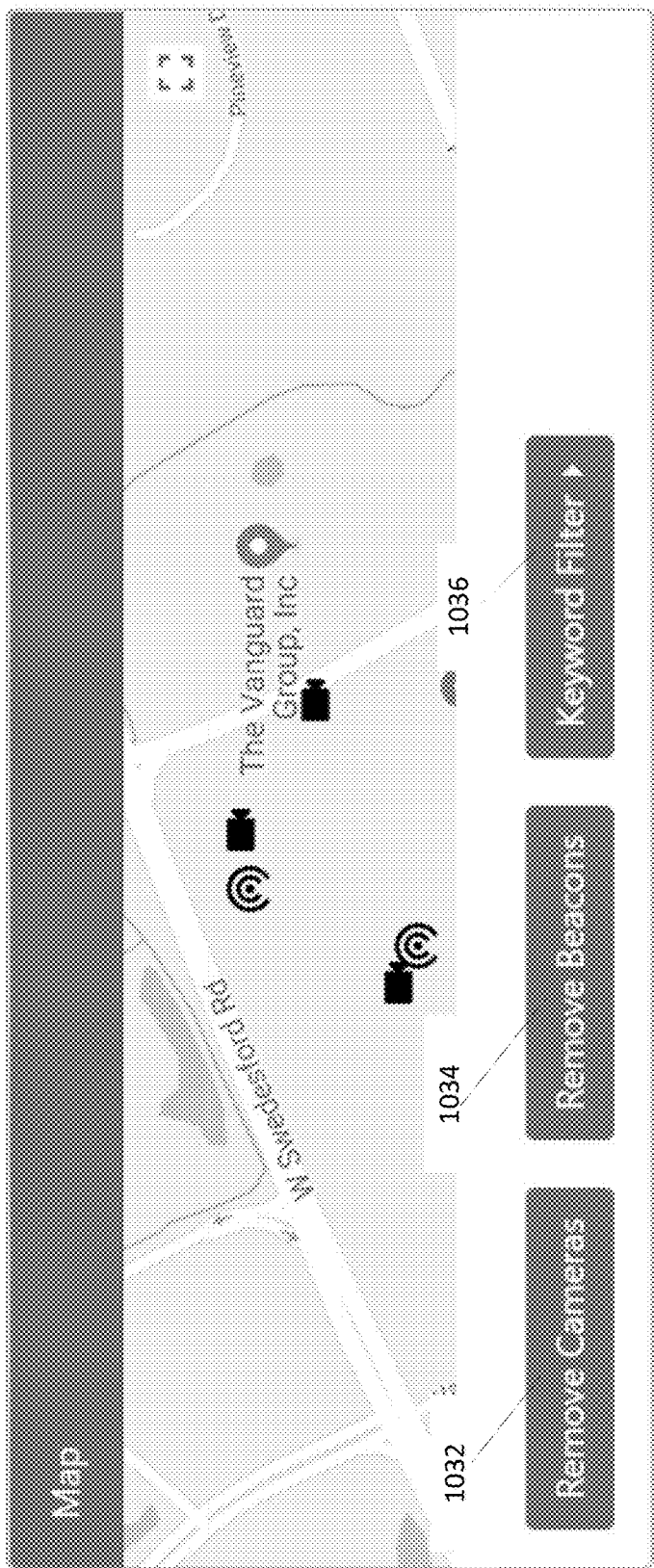
FIG. 12 is an image of an example map window within the dashboard of a user interface screen, according to an example embodiment of the present disclosure.

FIG. 12 is an image of an example map window 1008 within the dashboard 1002 of a user interface screen 1000, according to an example embodiment of the present disclosure. In the example shown, both the View Cameras 1022 and the View Beacons 1024 buttons have been selected, and the map window 1008 is updated to display the locations of cameras and beacons within the vicinity of the incident 102 selected in the data analysis window 1004. In the example shown, the View Cameras 1022 and the View Beacons 1024 buttons have been changed to the Remove Cameras 1032 and the Remove Beacons 1034 buttons, indicating user options to alter the display of the map window 1008 to remove the displayed cameras and beacons.

Figure 13:
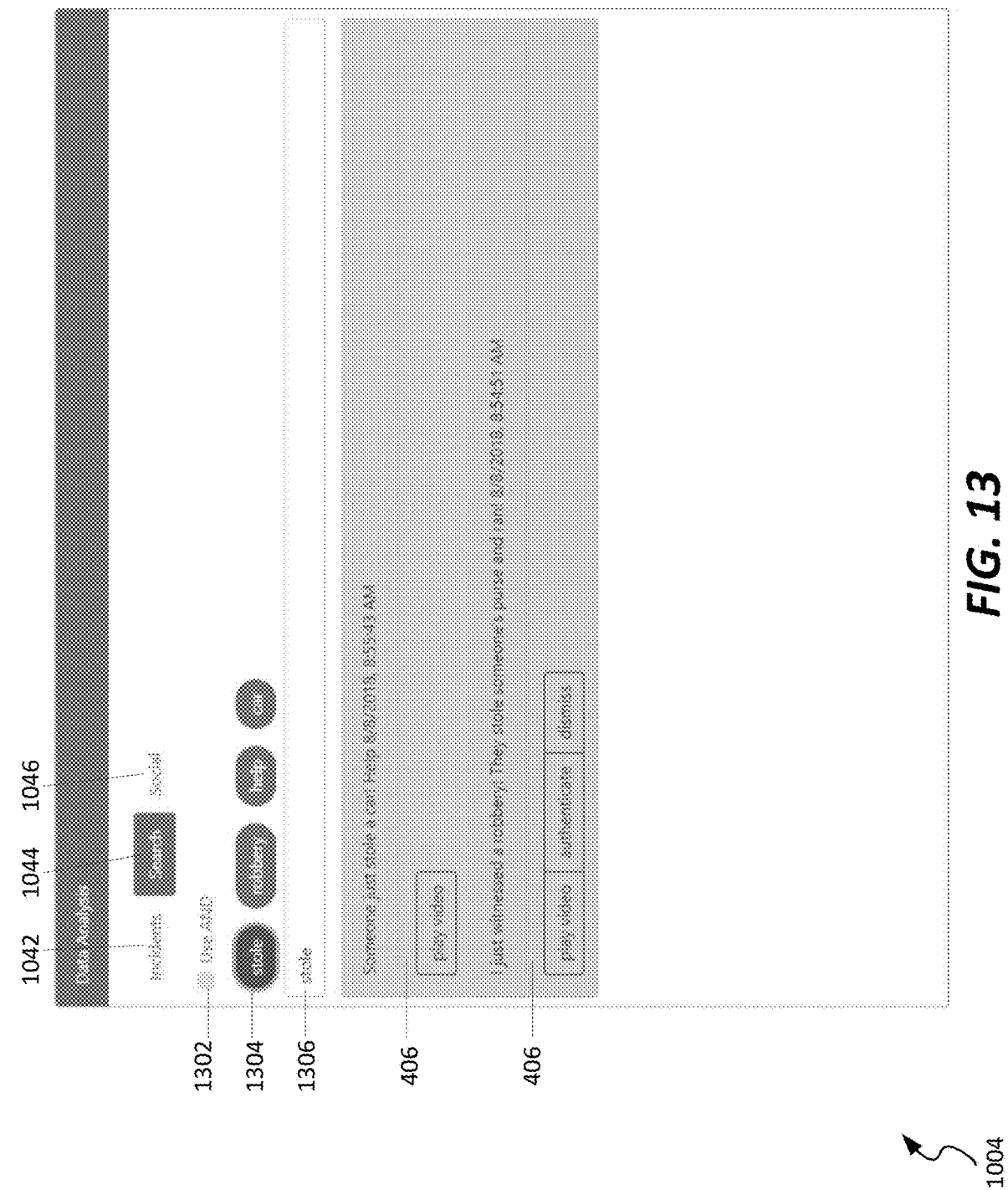
FIG. 13 is an image of an example data analysis window within the dashboard of a user interface screen, according to an example embodiment of the present disclosure.

FIG. 13 is an image of an example data analysis window 1004 within the dashboard 1002 of a user interface screen 1000, according to an example embodiment of the present disclosure. In the example shown, the Search button 1044 has been selected, and the data analysis window 1004 is updated to display a list of suggested keywords 1304 based on keywords extracted from the event messages of the event data objects 406 associated with the incidents 102. In some embodiment shown, the Search 1044 functionality is useful for searching for event data objects, for example, if a user is looking for a specific alert, the user could search using keywords, event time, data feed 140 device type, or event location, in addition to other event data object attributes. In the example shown, the data analysis window 1004 has also been updated to include a text box 1306 for receiving user text input for searching additional keywords not included in the list of suggested keywords 1304 or for searching additional attributes, e.g. event time, location, or data feed 140 device type. In the example shown, the "Use And" check box 1302 can be checked to search for event data objects 406 including all of the selected keywords. If the "Use And" check box 1302 is selected, the search would only return event data objects 406 including all of the selected keywords. In the example shown, the suggested keyword 1304 "stole" has been selected, the text box 1306 is updated to include the keyword "stole," and the event data objects 406 including the word "stole" are displayed in the data analysis window 1004.

Figure 14:
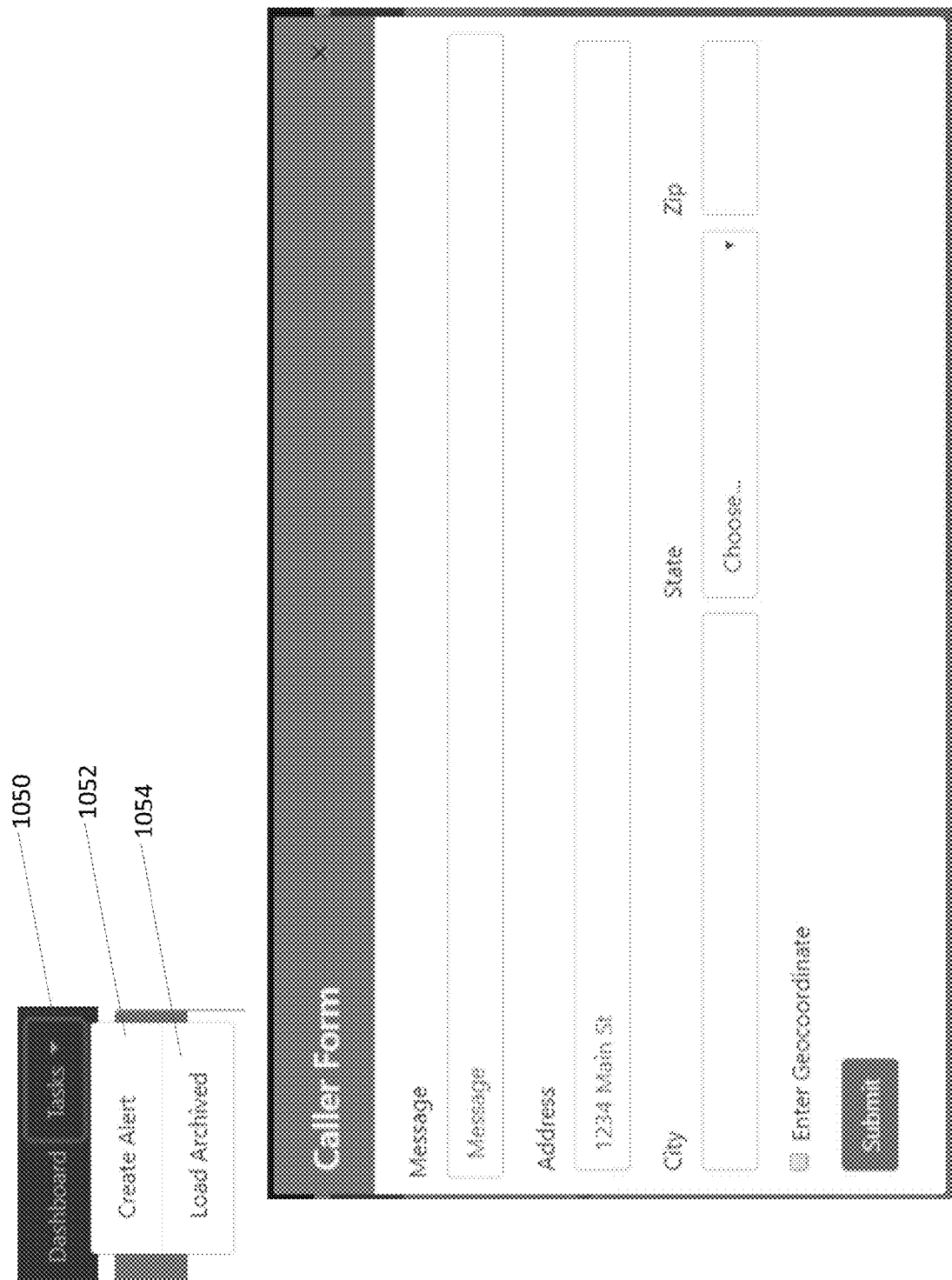
FIG. 14 is an image of an example caller form dialog box for generating an event, according to an example embodiment of the present disclosure.

FIG. 14 is an image of an example caller form dialog box 1400 for generating an event 106, according to an example embodiment of the present disclosure. In the example shown, the data analysis window 1004 is activated by selecting the Create Alert option 1052 from the Tasks 1050 dropdown menu within the dashboard 1002. In some embodiments, the caller form dialog box 1400 allows for manual input of an event message and an event location, for example, by emergency services personnel who receive a phone call from a member of the public who is not running the SmartApp 248. In some embodiments, the event time associated with an event data object 406 generated via the caller form dialog box 1400 can be determined when the user selects the Submit button.

In some embodiments, if a user of the dashboard 1002 has finished with an incident 102 and would like to use the data analysis window 1004 space for new incoming incidents, the user can archive any of the incidents 102 by selecting an Archive button (not shown). When the Archive button is pressed for a selected incident 102, the incident is recorded in a database, along with all of the event data objects 406 associated with the incident 102. In some embodiments, archived incidents 102 can be accessed. In the example shown, a user can select the Load Archived option 1054 from the Tasks 1050 dropdown menu, and an archive dialog box 1500 of archived incidents can be displayed, as further described and illustrated below in FIG. 15.

FIG. 15 is an image of an example archive dialog box 1500 for retrieving archived incidents 102, according to an example embodiment of the present disclosure. In the example shown, the archive dialog box 1500 includes a list of archived incidents 102, and for each of the archived incidents 102 in the list, the keywords associated with the incident 102, the location of the incident 102, and the data and time of the incident 102 are displayed. In some embodiments, if there are more incidents 102 than can be shown in the dialog box, the user can scroll through the incidents 102 and to make a selection, which will load the archived incident 102 for display in the data analysis window 1004.

Figure 16:
FIG. 16 is an image of an example email notification of an authenticated incident, according to an example embodiment of the present disclosure.

FIG. 16 is an image of an example email 456 notification of an authenticated incident 102, according to an example embodiment of the present disclosure. In the example shown, the email 456 includes the keywords associated with the incident 102, the location of the incident 102, the incident 102 time, a message associated with the incident 102, and a link to the dashboard 1004 or the SmartApp 248.

Figure 17:
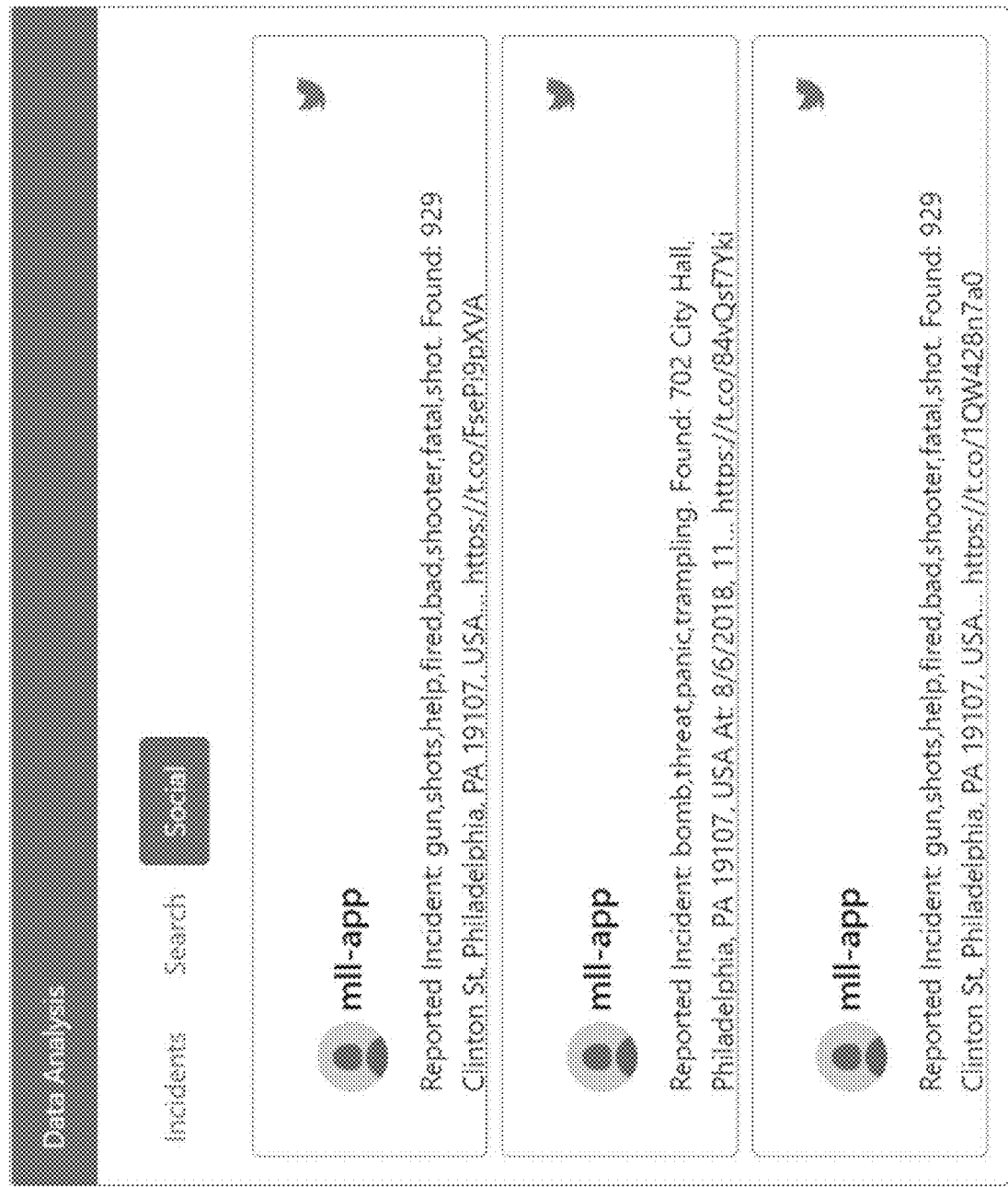
FIG. 17 is an image of a social media post notification of an authenticated incident, according to an example embodiment of the present disclosure.

FIG. 17 is an image of a social media post 1700 notification of an authenticated incident 102, according to an example embodiment of the present disclosure. In the example shown, the social media post 1700 includes the keywords associated with the incident 102, the location of the incident 102, a message associated with the incident 102, and a link to the dashboard 1004 or the SmartApp 248. In some embodiments, the server 132 running the incident response architecture 400 can post the message from the SmartApp 248 user reporting an event 106 and the date and time of the report with the event hashtag, and the command center 202 can filter social media posts according to the hashtag to determine if other similar events 106 have been reported on social media feeds 140.

Referring now to FIGS. 1-17 generally, and the incident detection and response platform described herein, it is noted that the systems described herein provide a number of advantages with respect to collection of event data to identify a potential incident. For example, embodiments disclosed herein improve the speed and quality of dissemination of information for a wide breadth of sources to the appropriate personnel, thereby improving the accuracy and timeliness of information related to emergency and public events. As such, the public and emergency response personnel obtain more accurate and timely situational awareness and can respond more effectively and quickly according to their role.

Additionally, embodiments disclosed herein improve the relaying and receiving of information related to an incident by providing a platform for assimilating data from a wide variety of data feed sources, associating and grouping the data into information, and sending alerts containing appropriate information to a wide variety of role-based user groups.

Disclosed embodiments also improve the handling of a large volumes of data from a wide variety of sources that would otherwise overwhelm emergency service personnel by analyzing the received data and outputting appropriate information to the correct user groups based on role.

Embodiments disclosed further improve responses to emergency or public incidents by providing a holistic picture of an incident so that appropriate user groups, e.g. emergency service personnel, can make the best decisions in a crisis situation, and thereby improve outcomes related to emergency or public incidents.

Embodiments disclosed improve the determination of the existence and priority level of emergency incidents by improving the grouping and association of emergency incident event-related data, including extraction of event data, classification of event data, determination of event data sentiment, event data frequency and similarity, clustering event data, and validating events.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An emergency incident response system comprising:
a programmable circuit;
a memory operatively connected to the programmable circuit, the memory storing an emergency incident detection and response application comprising instructions which, when executed, cause the programmable circuit to:
receive data from a plurality of heterogeneous data feeds each having a native format, the plurality of heterogeneous data feeds including one or more publically-available data feeds;
extract event data from the received data, the event data representing events from one or more of the plurality of heterogeneous data feeds;
translate the event data from the native format of the one or more heterogeneous data feeds into a standardized analysis format;
determine an existence and a priority level of at least one emergency incident contemporaneous with the event data and based at least in part on the event data, each of the at least one emergency incident being associated with at least one of the events, the priority level being selected from among a plurality of predefined priority levels;
determine an association of a plurality of the events;
group the associated events into one or more of the at least one emergency incidents based on the determined association; and
display a graphical user interface including a message describing the at least one determined emergency incident and a list of emergency incidents and events.

2. The emergency incident response system of claim 1, wherein the plurality of heterogeneous data feeds include at least one of a social media data feed, a beacon data feed, a video data feed, a smart app data feed, a manual input data feed, and a third party data feed.

3. The emergency incident response system of claim 1, wherein the standardized analysis format includes at least one human readable message describing details of the event, the time at which the event was created, and the location of the event.

4. The emergency incident response system of claim 1, wherein the instructions further cause the programmable circuit to:
compare the grouped events associated with the at least one emergency incident based on:
heterogeneous data feed type;
heterogeneous data feed reporting frequency;
heterogeneous data feed location;
heterogeneous data feed historical credibility; or
event data similarity;
cluster the grouped events;
determine the validity of the grouped events.

5. The emergency incident response system of claim 1, wherein the graphical user interface includes:
one or more user-input mechanisms configured to cause the programmable circuit to perform at least one of:
displaying a video playback of video data feed;
displaying a live video feed from a video data feed;
receiving a user authentication or dismissal of an event;
sending at least one emergency incident alert; and
the location of the at least one emergency incident.

6. The emergency incident response system of claim 1, wherein the instructions further cause the programmable circuit to:
generate at least one emergency incident notification alert including at least one of:
a push notification related to the at least one emergency incident;
a text message related to the at least one emergency incident;
an electronic mail message related to the at least one emergency incident;
a social media post related to the at least one emergency incident; or
an internet web page post.

7. The emergency incident response system of claim 6, wherein the instructions further cause the programmable circuit to send the at least one emergency incident notification alert to at least one user group.

8. The emergency incident response system of claim 7, wherein the at least one user group includes at least one of a public user group, an emergency responder user group, and a user-definable user group.

9. The emergency incident response system of claim 7, wherein the instructions further cause the programmable circuit to send event data to the at least one user group and receive modifications to the at least one emergency incident from the at least one user group based on permissions associated with the at least one user group.

10. A method of providing an emergency incident response, the method comprising:
receiving data from a plurality of heterogeneous data feeds each having a native format, the plurality of heterogeneous data feeds including one or more publically-available data feeds;
extracting event data from the received data, the event data representing events from one or more of the plurality of heterogeneous data feeds;
translating the event data from the native format of the one or more heterogeneous data feeds into a standardized analysis format;
determining an existence and a priority level of at least one emergency incident contemporaneous with the event data and based at least in part on the event data, each of the at least one emergency incident being associated with at least one of the events, the priority level being selected from among a plurality of predefined priority levels, wherein determining the existence and priority level of at least one emergency incident contemporaneous with the event data further comprises:
determining an association of a plurality of events; and
grouping events into incidents based on the determined association; and
displaying a graphical user interface including a message describing the at least one determined emergency incident and a list of emergency incidents and events.

11. The method of claim 10, wherein determining the existence and priority level of at least one emergency incident contemporaneous with the event data further comprises:
authenticating the at least one emergency incident, including:

comparing the grouped events associated with the at least one emergency incident based on at least one of:
  event data source;
  event data source reporting frequency;
  event data source location;
  event data source historical credibility; or
  event data similarity;
clustering the grouped events;
determining the validity of the grouped events.

12. The method of claim 10, wherein displaying a graphical user interface further comprises:
  displaying a set of user-input mechanisms configured to cause at least one of:
    displaying a video playback of video event data;
    displaying a live video feed from a video data source;
    receiving a user authentication or dismissal of an event;
    sending at least one emergency incident alert; and
  displaying the location of the at least one emergency incident.

13. The method of claim 10, further comprising:
  sending at least one emergency incident notification alert to at least one user group;
  sending event data to the at least one user group and receive modifications to the at least one emergency incident from the at least one user group based on permissions associated with the at least one user group.

14. An emergency incident response system comprising:
  a computing system communicatively connected to a plurality of client devices, the computing system configured to:
    receive data from a plurality of heterogeneous data feeds each having a native format, the plurality of heterogeneous data feeds including one or more publically-available data feeds received from external to the emergency incident response system;
    extract event data from the received data, the event data representing one or more events from one or more of the plurality of heterogeneous data feeds;
    translate the event data from the native format of the one or more heterogeneous data feeds into a standardized analysis format;
    determine an existence and a priority level of at least one emergency incident contemporaneous with the event data and based at least in part on the event data, each of the at least one emergency incident being associated with at least one of the one or more events, the priority level being selected from among a plurality of predefined priority levels;
    display a graphical user interface including a message describing the at least one determined emergency incident and a list of emergency incidents and events; and
    send at least one emergency incident notification alert to the plurality of client devices; and
  wherein the plurality of client devices are configured to, based on proximity to the location of the at least one determined emergency incident:
    receive the at least one emergency incident notification alert;
    send data associated with the one or more events to the computing system; and
    display the graphical user interface including the message describing the at least one determined emergency incident and the list of emergency incidents and events.

15. The emergency incident response system of claim 14, wherein the graphical user interface includes:
  one or more user-input mechanisms configured to cause the computing system to:
    display a video playback of video data feed;
    display a live video feed from a video data feed;
    receive a user authentication or dismissal of an event; and
  the location of the at least one emergency incident.

16. The emergency incident response system of claim 14, wherein the at least one emergency incident notification alert includes at least one of:
  a push notification related to the at least one emergency incident;
  a text message related to the at least one emergency incident;
  an electronic mail message related to the at least one emergency incident; or
  a social media post related to the at least one emergency incident.

17. The emergency incident response system of claim 14, wherein the plurality of client devices are sorted into user groups based on a set of predetermined permissions.

18. The emergency incident response system of claim 17, wherein the computing system is further configured to send event data to the plurality of client devices and receive modifications to the at least one emergency incident from the plurality of client devices based on user group.

* * * * *